(12) United States Patent
Li et al.

(10) Patent No.: US 10,259,948 B2
(45) Date of Patent: *Apr. 16, 2019

(54) COATING COMPOSITIONS AND COATING PRODUCTS MADE THEREFROM

(71) Applicants: KANEKA CORPORATION, Osaka (JP); THE TEXAS A&M UNIVERSITY SYSTEM, College Station, TX (US)

(72) Inventors: Peng Li, College Station, TX (US); Masahiro Miyamoto, Osaka (JP); Hung-Jue Sue, College Station, TX (US); Shinsuke Akao, Osaka (JP)

(73) Assignees: KANEKA CORPORATION, Osaka (JP); THE TEXAS A&M UNIVERSITY SYSTEM, College Station, TX (US)

( * ) Notice: Subject to any disclaimer, the term of this patent is extended or adjusted under 35 U.S.C. 154(b) by 301 days.

This patent is subject to a terminal disclaimer.

(21) Appl. No.: 14/757,509

(22) Filed: Dec. 23, 2015

(65) Prior Publication Data

US 2016/0115324 A1 Apr. 28, 2016

(51) Int. Cl.
| | |
|---|---|
| C09D 7/00 | (2018.01) |
| C09D 5/08 | (2006.01) |
| C09D 7/40 | (2018.01) |
| C08K 3/32 | (2006.01) |

(52) U.S. Cl.
CPC ............. C09D 5/084 (2013.01); C09D 7/70 (2018.01); C08K 3/32 (2013.01)

(58) Field of Classification Search
CPC ...... C09D 5/084; C09D 7/1291; C09D 5/185; C08K 3/32; C08K 11/06; B32B 15/043; B32B 7/14; B32B 15/08; H05B 33/14
See application file for complete search history.

(56) References Cited

U.S. PATENT DOCUMENTS

| | | | |
|---|---|---|---|
| 5,811,504 A | 9/1998 | Shiota et al. | |
| 7,108,935 B2 | 9/2006 | Bauer et al. | |
| 7,556,743 B2 | 7/2009 | Furman et al. | |
| 9,321,919 B2* | 4/2016 | Sue et al. | ......... C08J 5/005 |
| 2005/0137288 A1* | 6/2005 | Maruo et al. | ......... C08K 9/04 |
| | | | 523/216 |
| 2009/0035469 A1 | 2/2009 | Sue et al. | |
| 2010/0009165 A1 | 1/2010 | Patel et al. | |
| 2010/0092765 A1 | 4/2010 | Hager et al. | |
| 2012/0065311 A1 | 3/2012 | Chakraborty et al. | |

FOREIGN PATENT DOCUMENTS

| | | |
|---|---|---|
| EP | 2 352 789 A1 | 8/2011 |
| EP | 2 752 466 A2 | 7/2014 |
| EP | 2 752 466 A3 | 7/2014 |
| JP | 2010-095392 | 4/2010 |
| KR | 100764560 | 10/2007 |
| WO | WO 2005/100466 | 10/2005 |
| WO | WO 2009/014685 | 1/2009 |
| WO | WO/2014/107641 | 7/2014 |

OTHER PUBLICATIONS

International Search Report dated Jun. 17, 2015 in PCT/US15/22488.
Naima Bestaoui, et al., "Intercalation of polyether amines into α-zirconium phosphate", Journal of Materials Chemistry, 2005, 6 pages www.rsc.org/materialls.
Weiyi Xing, et al., "Flame retardancy and thermal properties of epoxy acrylate resin/alpha-zirconium phosphate nanocomposites used for UV-curing flame retardant films", Materials Chemistry and Physics, 125, 2011, pp. 196-201.
H.-J.Sue, et al., "Epoxy Nanocomposites Based on the Synthetic α-Zirconium Phosphate Layer Structure", Chem. Mater. 2004-, 16, XP-001184747, pp. 242-249.
PCT/US2014/010288 International Search Report and Written Opinion dated Jul. 16, 2014 (10 pages).
Extended European Search Report dated Jun. 19, 2015 in European patent application No. 13189779.5 (8 pages).
Office Action dated Jul. 27, 2015, in European patent application No. 13189779.5 (2 pages).
Bestaoui et al, "Intercalation of polyether amines into α-zirconium phosphate", *J.Mater. Chem.*, 2006, vol. 16, pp. 759-764.
Klapyta et al, "Intercalation of protonated polyoxyalkylene monoamines into a synthetic Li-fluorotaeniolite", *Applied Clay Science*, 2011, vol. 52, pp. 133-139 XPO28372089.

* cited by examiner

*Primary Examiner* — Nathan M Nutter
(74) *Attorney, Agent, or Firm* — Oblon, McClelland, Maier & Neustadt, L.L.P.

(57) ABSTRACT

A coating composition and coating products made therefrom, containing modified inorganic nanoplatelets that form mesomorphic structure in a resin phase. The coating products exhibit low permeation/penetration properties, and can be used as anti-corrosion or barrier coatings.

17 Claims, 22 Drawing Sheets
(3 of 22 Drawing Sheet(s) Filed in Color)

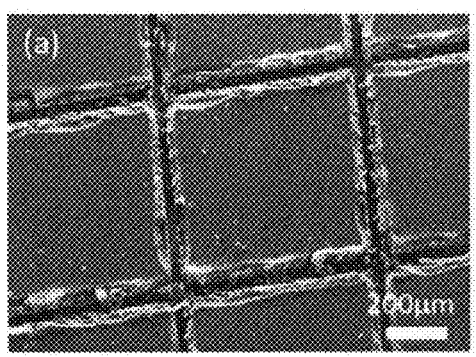 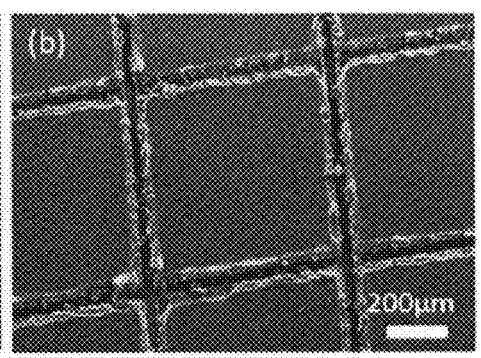
FIG. 11A                    FIG. 11B

FIG. 14A    FIG. 14B    FIG. 14C
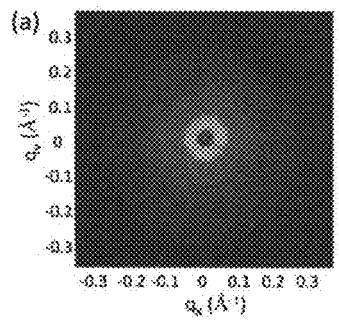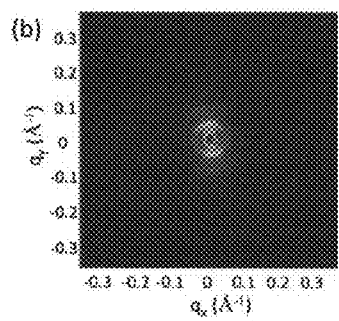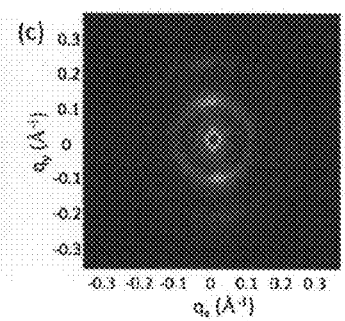
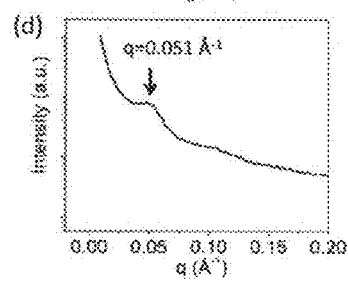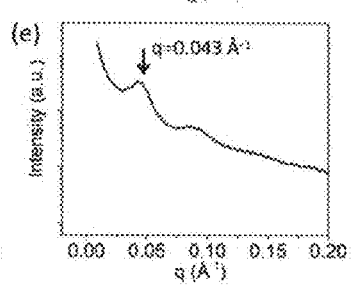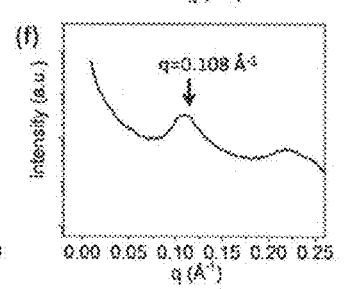
FIG. 14D    FIG. 14E    FIG. 14F

COATING COMPOSITIONS AND COATING PRODUCTS MADE THEREFROM

CROSS-REFERENCE TO RELATED APPLICATIONS

The present application is a continuation-in-part of International Application No. PCT/US2015/022488, filed Mar. 25, 2015, which is based upon and claims the benefits of priority to U.S. Provisional Application No. 61/970,028, filed Mar. 25, 2014. The present application is also based upon and claims the benefits of priority to U.S. Provisional Application No. 62/096,314, filed Dec. 23, 2014. The entire contents of all of the above applications are incorporated herein by reference.

BACKGROUND OF THE INVENTION

Field of the Invention

The present invention relates to coating compositions and coating products made therefrom, containing modified inorganic nanoplatelets that form mesomorphic structure in a resin phase. The coating products exhibit low permeation/penetration properties, and can be used as anti-corrosion or barrier coatings.

Background Art

Metal corrosion is estimated to cost the U.S.A. $300 billion dollars annually.[1] A wide variety of anti-corrosion coating technologies have been developed to prevent or delay metal corrosion. However, the technologies that are known to be effective tend to cause undesirable side effects. For example, chromate-based coatings, which exhibit excellent corrosion resistance, are banned from usage in many applications because of their toxicity and carcinogenicity.[2] Zinc-based coatings are inconvenient as well due to their lack of ductility, high cost, and scarcity of raw materials.[3] Zeolites,[4, 5] ceramics,[6] and graphene[7, 8] have also been explored as corrosion-resistant coating materials, but show only limited success.

Recently, a new generation of organic coatings has attracted significant attention due to their facile and eco-friendly nature in fabrication and functionalization.[9-12] Strategies employed to prepare these new organic-based coatings include, but are not limited to, hydrophobicity-induced reduction in water accessibility,[13-15] passive oxidation-enabled metal protection,[16-18] and nanofiller-integrated corrosion inhibition.[19-22] However, the methodologies for preparing these new organic coatings usually involve complex chemistries and processes, making them difficult for large-scale commercial implementation. New anti-corrosion organic coatings that utilize existing industrial practices, such as spray coating, are rigorously sought after.

Plate-like nanostructures, such as graphene and its derivatives and clay, are impermeable to gases and moisture.[23, 24] Therefore, nanocomposite coatings containing 2D plate-like nanostructure have been reported to improve the corrosion resistance of metals.[18-21] It has been found that barrier properties of these protective coatings strongly depend on the nanoplatelet aspect ratio, volume fraction, dispersion level, and particularly the degree of alignment of the fillers.[25, 26] Inspired by highly aligned platelet-based lamellar structures observed in natural materials, such as nacre.[27] several assembly techniques have been developed to fabricate polymer/clay nanocomposites with similar lamellar structure, such as Layer-by-Layer (LbL) assembly,[28] ice templating and sintering of ceramics,[29] vacuum-assisted self-assembly,[30] electrophoretic deposition,[31] and air/water interface assembly.[32, 33] However, most of the above approaches share the limitations of requiring time-consuming sequential depositions or extensive energy consumption, which severely hinder their large-scale applications.

SUMMARY OF THE INVENTION

The present invention relates to coating compositions comprising: a polymeric resin; inorganic nanoplatelets; and an oligomer, wherein said inorganic nanoplatelets are modified with said oligomer and are capable of forming a mesomorphic structure in said polymeric resin phase. The polymeric resin preferably comprises at least one selected from the group consisting of epoxy resins, poly(meth)acrylates, polyurethanes, polyesters, polyolefins, amorphous cycloolefin copolymers, polyimides, polycarbonates, polyvinyl chlorides and polystyrenes. The polymeric resin preferably comprises at least one selected from the group consisting of epoxy resin monomers, (meth)acrylate monomers, epoxy acrylates, urethane acrylates, acrylic acrylates, polyester acrylates, thermosetting urethanes, thermosetting polyesters, alkyd resins and phenolic resins. The inorganic nanoplatelets preferably comprise at least one layered inorganic material selected from the group consisting of natural silicates, synthetic silicates, montmorillonite, bentonite, laponite, metal phosphates, metal oxides, metal hydroxides, graphite, graphene and derivatives thereof. The oligomer preferably comprises at least one selected from the group consisting of amines and amides. The oligomer preferably comprises a polyether monoamine.

The present invention also relates to a coating product which is obtainable by applying the coating composition of the present invention.

The present invention also relates to a cured product which can be obtained by curing the coating composition of the present invention, comprising a polymeric resin matrix which is obtained by curing the resin. The content of the inorganic nanoplatelets is preferably at least 5 wt % and less than 30 wt %. The said oligomer modified inorganic nanoplatelets form mesomorphic structure by itself in the polymeric resin phase. The assembled mesomorphic structures are defined here as nematic or smectic phases of the said nanoplatelets. Preferably, the inorganic nanoplatelets form smectic structure. The d-spacing of the mesomorphic structure is 130 nm or less.

The present invention also relates to a metal material and article comprising a surface coated with the coating composition, the coating or the cured product of the present invention, the metal being at least one selected from the group consisting of steel, aluminum, titanium, magnesium, copper, brass and alloyed metals containing thereof.

The present invention also relates to a polymer film comprising, on one or both sides, a surface coated with the coating composition, the coating or the cured product of the present invention, the film containing at least one selected from the group consisting of poly(meth)acrylates, polyurethanes, polyesters, polyolefins, polyimides, polycarbonates, polyesters, polystyrenes, poly(meth)acrylate-co-styrenes and cellulose derivatives.

BRIEF DESCRIPTION OF THE DRAWINGS

The patent or application file contains at least one drawing executed in color. Copies of this patent or patent application publication with color drawings will be provided by the Office upon request and payment of the necessary fee.

A more complete appreciation of the invention and many of the attendant advantages thereof will be readily obtained as the same becomes better understood by referencing to the following detailed description when considered in connection with the accompanying drawings, wherein:

FIGS. 11A and 11B show SEM images of neat epoxy coating (FIG. 11A) and smectic epoxy/ZrP coating (FIG. 11B) on the aluminium substrates after testing for adhesion property according to ASTM standard D 3359-02.

FIGS. 14A-14F show SAXS 2D and 1D diffractograms of the oligomer modified ZrP in various solvents including xylene (FIGS. 14A, 14D), water (FIGS. 14B, 14E), and THF (FIGS. 14C, 14F), respectively.

DETAILED DESCRIPTION OF THE EMBODIMENTS

Figure 1A:
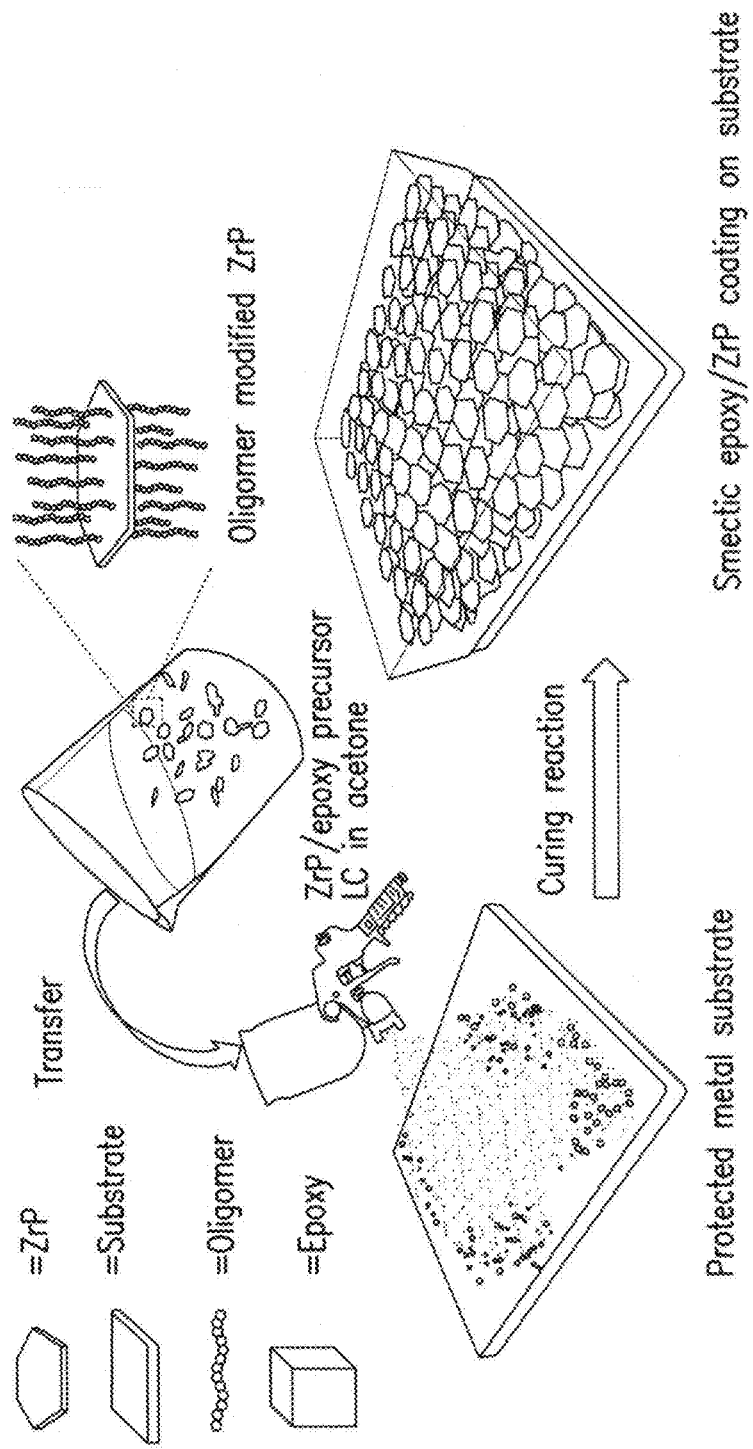
FIG. 1A shows a schematic of the preparation process of smectic epoxy/ZrP coating.

The embodiments will now be described with reference to the accompanying drawings, wherein like reference numerals designate corresponding or identical elements throughout the various-drawings.

<Coating Composition>

The coating composition of the present invention comprises at least one resin and at least one oligomer modified inorganic nanoplatelet that self-assembles into mesomorphic structure in said polymeric resin matrix.

<Resin>

The resin contained in the coating composition of the present invention is not particularly limited, and examples thereof include thermosetting resins, photo-curable resins (resins that can be cured upon exposure to electron beam or a light in a range of ultraviolet to visible ray), thermoplastic resins. In the present invention, this resin constitutes the matrix of the coating composition.

Examples of the resin include epoxy resins, poly(meth) acrylates, polyurethanes, polyesters, polyolefins, amorphous cycloolefin copolymers, polyimides, polycarbonates, polyvinyl chlorides, and polystyrenes. Not only the resins themselves but also those which cure to form a resin may be used. Examples thereof include epoxy resin monomers, (meth) acrylate monomers, epoxy acrylates, urethane acrylates, and acrylic acrylates. These resins may be used alone or in combination of two or more.

The resin preferably comprises at least one selected from the group consisting of epoxy resin, (meth)acrylate monomers, epoxy acrylates, urethane acrylates, polyester acrylates. From the viewpoint of mesomorphic structure with less defect and self-assemble attribute, epoxy resin, (meth) acrylate monomers are particularly preferred.

<Inorganic Nanoplatelets>

The inorganic nanoplatelets described in this invention are oligomer modified inorganic nanoplatelets that self-assemble into mesomorphic structure in said resin matrix. This oligomer modified inorganic nanoplatelets are exfoliated nanoplatelts or single crystalline layers of nanoplatelets that has oligomers or oligomeric functional groups on its surface. The inorganic nanoplatelets are planar shape inorganic substances which can be obtained by exfoliating inorganic layered (lamellar) materials.

The inorganic nanoplatelets are preferably planar shape inorganic substances having a number average height (or number average thickness) of smaller than 10 nm, and also having a number average length and a number average width of at least 10 nm or more.

The number average height is preferably not larger than 7 nm, more preferably not larger than 4 nm, and still more preferably not larger than 2 nm. It is preferably not smaller than 0.35 nm, and more preferably not smaller than 0.7 nm.

The number average length and the number average width are each preferably not smaller than 30 nm, and more preferably not smaller than 50 nm. Also these length and width are preferably not larger than 2,000 nm, and more preferably not larger than 1,200 nm.

The ratio between the height and the length or width (height/length or height/width) is preferably less than 1/2. The ratio is more preferably 1/10000 to 1/3, still more preferably 1/2000 to 1/10, and particularly preferably 1/1500 to 1/30.

The main plane (the largest plane) of each inorganic nanoplatelet may be in the shape of rectangle, square, pentagonal, hexagonal, heptagonal, octagonal, circle or irregular feature. Examples of the structure having the aforementioned dimensional ratio include a clay structure (e.g., the structure of montmorillonite clay).

<Layered Inorganic Material>

The inorganic nanoplatelets can be delivered from any inorganic layered material containing at least one element selected from the group consisting of aluminum, silicon, magnesium, zirconium, titanium, hafnium, and rutherfordium.

Specifically, the inorganic nanoplatelets preferably can be delivered at least one inorganic layered material selected from the group consisting of natural silicates, synthetic silicates, montmorrillonite, bentonite, laponite, metal phosphates, metal oxides, metal hydroxides, graphite, graphene, and derivatives thereof.

Synthetic inorganic layered materials are more preferred to obtain said inorganic nanoplatelet in the viewpoint of narrower distribution of the number average length or width of resulted nanoplatelets. From the viewpoints of high cation exchange performance, feasibility to modify the hydroxy groups on layer surface, the inorganic nanoplatelets preferably comprise α-zirconium phosphate (also abbreviated as α-ZrP or ZrP).

Metal phosphates (e.g., α-ZrP) as said layered materials may be prepared from a precursor. The precursor may be any compound that can be converted into a phosphate by reaction. Examples thereof include nitrates, chlorides and hydrates thereof.

α-Zirconium phosphate can be synthesized by refluxing zirconyl chloride octahydrate ($ZrOCl_2 \cdot 8H_2O$) under ordinary or increased pressure in the presence of phosphoric acid ($H_3PO_4$), and can be used as said layered inorganic material in this invention.

<Exfoliation and Modification of Layered Inorganic Materials>

Exfoliation of inorganic layered (lamellar) materials to obtain inorganic nanoplatelets can be performed by any known method.

Exfoliation of montmorillonite, for example, can be achieved by mixing montmorillonite with water, thereby hydrating interlayer cations, and subjecting montmorillonite to shear, thereby exfoliating respective layers. Exfoliated nanoplatelets can also be obtained by intercalation of oligomers or oligomeric functional groups into layered inorganic materials, followed by being subject to shear or sonication. In this instance, intercalation of said oligomers results in oligomer modified surface of exfoliated nanoplatelets. Any apparatus such as bath-type ultra-sonication device, ultra-sonic homogenizer, bead mill, ball mill, jet mill, high-speed disperser, homogenizer and high-pressure homogenizer may be used to give shear or sonication to obtain said exfoliated nanoplatelets herein.

The inorganic nanoplatelets are oligomer modified inorganic nanoplatelets. The term "modify" and its derivatives herein mean that the oligomer is adsorbed or chemically attached on the surface of said inorganic nanoplatelets.

The oligomer may be any one that can give the inorganic nanoplatelets that self-assemble into mesomorphic structure in said resin matrix. Examples thereof comprise any oligomers having functional groups such as amines, amides, epoxides, hydroxyls, formyls, carboxyls. The molecular weight of the oligomer is greater than 100 g/mol, preferably 850 g/mol, more preferably 900 g/mol, and still more preferably, 1,000 g/mol. From the viewpoint of affinity to the surface of the inorganic nanoplatelets that may affect to the formation of mesomorphic structure, amines and amides are preferred. The oligomer comprising polyether monoamines are particularly preferred, and these polyether monoamines comprise alkyleneoxy poly(alkyleneglycol) monoamines wherein the alkylene glycol unit comprise polyethylene glycol segment or polypropylene glycol segment or mixtures thereof. The molecular weight of the polyether monoamine is greater than 100 g/mol, preferably 850 g/mol, more preferably 900 g/mol, and less than 10,000 g/mol, preferably 5,000 g/mol, more preferably 3,500 g/mol. The molecular weight of the oligomers mentioned herein can be measured by GPC (Size exclusion chromatography) analysis using polystylene standard.

The amount of oligomer used for in the modification is preferably at least 20 mol, more preferably at least 50 mol, still more preferably at least 60 mol, and preferably at most 200 mol, more preferably at most 150 mol, still more preferably 120 mol, relative to 100 mol of inorganic nanoplatelets. The amount less than 20 mol may lead to insufficient exfoliation of inorganic lamellar compounds or insufficient modification of inorganic nanoplatelets. The amount exceeding 200 mol may adversely affect the physical properties of the coating or the cured product.

Excess oligomers, namely an oligomer which is not adsorbed on inorganic nanoplatelets can be removed since it remains dissolved in the supernatant liquid by centrifugation. Inorganic nanoplatelets modified with oligomers can be condensed into a gel form and settled, enabling recovery thereof. They can be added into a suitable solvent and re-dispersed.

Examples of the method of modifying the inorganic layered material or exfoliated nanoplatelets with the oligomer include a method in which the inorganic layered material or exfoliated nanoplatelets are suspended in at least one solvent and then the oligomer is added to this mixture.

Examples of said solvent include water; alcohols such as methanol, ethanol, 2-propanol and 1-butanol; ketones such as acetone, methyl ethyl ketone and methyl isobutyl ketone; acetate esters such as methyl acetate, ethyl acetate and butyl acetate; ethers such as diethyl ether, ethylene glycol monomethyl ether, propylene glycol monomethyl ether, tetrahydrofuran and 1,3-dioxolane; halogenated hydrocarbons such as dichloromethane and chloroform; aromatic hydrocarbons such as toluene and Xylene; and nitrogen-containing solvents such as N, N-dimethylformamide, N, N-dimethylacetamide, dimethyl sulfoxide and N-methylpyrrolidone. These solvents may be used alone or in combination of two or more.

The content of the inorganic nanoplatelets in a suspension is preferably at most 15 weight parts, more preferably at most 5 weight parts, relative to 100 weight parts of the solvent. From the viewpoint of productivity, the content is generally at least 0.1 weight parts, more preferably 1 weight parts relative to 100 weight parts of the solvent. The content larger than 15 weight parts may cause excessive increase of viscosity when the inorganic layered materials are intercalated, which leads to insufficient mixing, and consequently intercalation may result in being inconsistent or the handling may be difficult.

Adding a small amount of water to hydrophilic organic solvent can promote and accelerate the intercalation of oligomers. From the viewpoint of acceleration of the intercalation of oligomers in an organic solvent, the water content of the water-soluble organic solvent is preferably at least 1% by volume, preferably 2% by volume and more preferably at least 4% by volume. The water content is preferably at most 10% by volume and more preferably at most 8% by volume. The water content less than 1% by volume may cause insufficient promotion of the intercalation of oligomers. The water content larger than 10% by volume may lower the solubility of the resin matrix and it may become difficult to obtain a homogeneous composition. Excessive water content is also not preferable from the viewpoint of removal of water which requires a larger amount of energy.

Depending on oligomers, modification and exfoliation can be carried out in one pot.

For example, when α-ZrP is used as the inorganic layered material, α-ZrP nanoplatelets can be prepared by mixing α-ZrP with an alkyl ammonium salt, more specifically tetra-n-butyl ammonium hydroxide (TBA+OH−), in water and exposing the mixture to ultrasonic waves. The molar ratio between said α-ZrP and the alkyl ammonium salt (α-ZrP: alkyl ammonium salt) is preferably about 1:0.6 to about 1:1.2. The α-ZrP nanoplatelets exfoliated and dispersed in water can be condensed into a gel form by centrifugation. The supernatant of the gel is then removed and the remaining gel-form substance is mixed with an organic solvent (e.g., acetone). By repeating this procedure a couple of times and removing water, α-ZrP nanoplatelets dispersed in the organic solvent are obtained. Water can be removed from the mixture using rotary evaporator under reduced pressure to replace with organic solvent. α-ZrP nanoplatelets can be directly obtained from α-ZrP layered material depending on the choice of organic solvent(s). Preparation of nanoplatelets using tetra-n-butyl ammonium hydroxide can be efficiently applied to other inorganic layered materials such as montmorillonite.

Above mentioned surface modified inorganic nanoplatelets dispersed in wet organic solvent may be used in preparation of coating composition without further treatment or purification. Water content in this wet organic solvent is preferably at most 2% by volume, and more preferably at most 1% by volume, from the viewpoint of drying time upon application. If more than 2% by volume of water remains, the coating or the cured product obtained from corresponding coating composition may result in poor quality due to defects such as voids, blisters, blushing and cratering. Removal of water in the organic solvent or replacement of water alone with the organic solvent can be carried out under reduced pressure, for example, using rotary evaporator.

<Coating Composition>

The coating composition disclosed in this invention may be prepared by any method, and examples thereof include a process comprising modifying said inorganic layered material with the oligomer, exfoliating the compound into nanoplatelets and mixing the nanoplatelets with a resin to form a composition.

In said coating composition of this invention, the oligomer modified inorganic nanoplatelets form mesomorphic structure in the resin matrix.

The coating composition may contain at least one solvent. The solvent is not particularly limited, and examples thereof include the solvent contained in the above-mentioned dispersion of the modified inorganic nanoplatelets and the solvent which can dissolve the resin.

The content of the inorganic nanoplatelet in the coating composition excluding solvent is preferably at least 5% by weight, more preferably at least 8% by weight, and preferably at most 30% by weight, more preferably at most 20% by weight. At least 5% by weight or more of the inorganic nanoplatelets may result in minimizing defect in said mesomorphic structure. More than 30% by weight of the inorganic nanoplatelets may unduly impair the original properties of the resin matrix.

When the coating composition contains a solvent, the content of the components other than the solvent in the coating composition is preferably at least 2% by weight, more preferably at least 5% by weight, and still more preferably at least 10% by weight. The content is preferably at most 90% by weight, more preferably at most 70% by weight, and still more preferably at most 50% by weight. The content is generally preferably 15% to 40% by weight. Less than 2% by weight of the components may remarkably decrease productivity and also may increase the energy load at the time of coating. More than 90% by weight of the components may lead to high viscosity or gelation of the composition, making it difficult to form a coating and the like. The content of the components other than the solvent can be adjusted within the above range by addition of the solvent or vacuum heating concentration.

The content of the oligomer in the composition is preferably at least 50 mol, more preferably at least 60 mol, and preferably at most 150 mol, more preferably at most 120 mol, relative to 100 mol of inorganic nanoplatelets. If the content is less than 50 mol, modification and exfoliation of inorganic lamellar compounds may be insufficient. If the content exceeds 150 mol, the physical properties of the coating or the cured product may be adversely affected.

The coating composition of the present invention may contain additives such as curing agents, curing accelerators, chain transfer agents, photo-initiator, photosensitizer agents, reducing agents, plasticizers, fillers, adhesion-imparting agents, leveling agents, antifoaming agents, dyes, pigments, stability agents, ultraviolet absorbers, organic solvents and water.

<Coating Product and Cured Product>

Coating products or cured products disclosed in this present invention can be produced by applying the coating composition of this invention to any kind of substrate, followed by drying and/or curing the coating composition mentioned herein.

Curing of the coating composition needs to be performed through appropriately selected method(s) in accordance with the type of the resin.

In the coating or the cured product, the content of the inorganic nanoplatelets is preferably at least 5 wt %, and more preferably at least 8 wt %. The content thereof is preferably less than 30 wt %, and more preferably less than 20 wt %. At least 5% by weight or more of the inorganic nanoplatelets may secure minimizing defect in said mesomorphic structure. If the content is 30 wt % or more, the original properties of the resin matrix may be unduly impaired.

In the coating or the cured product, the inorganic nanoplatelets incorporated therein preferably form mesomorphic structure that defined as smectic phase of said nanoplatelets. The phrase "form smectic structure" and its derivatives herein mean the state where the inorganic nanoplatelets form multiple layers parallel to each other and are aligned such that the main planes of the inorganic nanoplatelets are parallel to the surfaces of the respective layers.

The mesomorphic structure, or preferably smectic phase, has d-spacing of 130 nm or less, preferably 50 nm or less, more preferably 20 nm or less, and still more preferably 10 nm or less. Also said d-spacing is at least twice of d-spacing of the original layered material that used to obtain the modified inorganic nanoplatelet, and preferably at least 2 nm, more preferably 3 nm, and still more preferably at least 4 nm. The structure having d-spacing of more than 130 nm tends to be difficult to form mesomorphic structure described in this invention. Also, d-spacing less than twice of d-spacing of the original layered material may make it difficult to form smectic structure in long range order.

According to the "tortuous pathway" concept,[46] the coating or the cured product of the present invention has a brick wall structure constituted by the oligomer-modified inorganic nanoplatelets. The penetrant can only wiggle through the permeable polymer gaps between the platelet layers. Thus, the coating or the cured product shows high gas barrier properties. An increased aspect ratio and improved alignment of the nanoplatelets will significantly improve the gas barrier properties, leading to a greatly enhanced anti-corrosion performance (FIG. 5B).

Therefore, by applying the coating composition in this invention to the surface of a substrate followed by drying or curing the composition, the surface of the substrate can be covered and effectively protected from penetrants such as oxygen and moisture. If the substrate is a metal material, the coating composition can prevent corrosion of the metal material.

The coating composition can be applied to any substrate by any application technique, and non-limitative examples thereof include knife coating, bar coating, spray coating, dip coating, spin coating, roll coating, die coating and curtain coating, screen printing and immersion (dip) coating.

A substrate comprising, on one or both sides, a surface coated with the coating composition, the coating or the cured product of the present invention is also one aspect of the present invention. Examples of the substrate include metallic articles such as sheets, coils, panels, polymeric articles such as films, sheets and molded products, and glass articles such as glass sheets and panels.

The metal is preferably at least one selected from the group consisting of steel, aluminum, titanium, magnesium, copper, brass, zinc and alloyed metals thereof.

The polymer film preferably contains at least one selected from the group consisting of poly(meth)acrylates, polyurethanes, polyesters, polyolefins, polyimides, polycarbonates, polystyrenes, poly(meth)acrylate-co-styrene, polyacrylonitrile-co-butadiene-co-stylene (ABS), and cellulose derivatives.

<End Application>

The coating composition, the coating product or the cured product of the present invention can suitably be used as protective coatings, barrier (low penetration) materials to keep gas, moisture or chemicals confined or isolated. Since they have high gas barrier properties, they are particularly suitably used for highly effective anti-corrosion coatings. Examples of the substrate to be covered include the aforementioned metal materials/articles such as steel, aluminum, titanium, magnesium, copper, brass and alloyed metals containing thereof, polymer films such as poly(meth)acrylates, polyurethanes, polyesters, polyolefins, polyimides, polycarbonates, polyesters, polystyrenes, poly(meth)acrylate-co-styrenes and cellulose derivatives, and glass.

EXAMPLES

The present invention is described below referring to, but not limited to, the examples.

Example 1

Materials: Zirconyl chloride ($ZrOCl_2.8H_2O$, 98%, Aldrich) and phosphoric acid (85%, EM Science) were used as received. A commercial polyethermonoamine, Jeffamine® M1000, was obtained from Huntsman Chemical Corporation. Bisphenol F epoxy resin (EPON® 862) and Epikure W curing agent were purchased from Momentive. Aluminum (6061) was purchased from McMaster-Carr.

Synthesis of α-ZrP layered material and exfoliation into α-ZrP nanoplatelets: ZrP nanoplatelets were prepared using a previously reported refluxing method.[35] Initially, 15.0 g of zirconyl chloride ($ZrOCl_2. 8H_2O$, 98%) was refluxed in 150.0 mL of 3.0 M $H_3PO_4$ for 24 hr. The ZrP product was washed three times with de-ionized (DI) water through centrifugation and resuspension, dried at 65° C. in an oven for 24 hr, and then gently ground into a fine powder with a mortar and pestle. Finally, the ZrP powder was exfoliated with a commercial monoamine intercalating agent (Jeffamine® M1000) in acetone.

Preparation of smectic epoxy/ZrP nanocomposite coating: 5 g of Bisphenol F epoxy was dissolved in 10 mL of acetone to form a clear solution. The epoxy solution was added dropwise to a stirring ZrP acetone dispersion (20 mg/mL) which was allowed to stir for 6 hr to achieve a homogenous dispersion. The solvent was removed by a rotary evaporator. Then, 1.33 g of Epikure W curing agent was added at a stoichiometric ratio and homogenized by mechanical mixing. The epoxy/ZrP liquid mixture was applied to a metal substrate by spray-coating. Finally, the films were cured under nitrogen atmosphere at 40° C. for 2 hr, 90° C. for 2 hr, 120° C. for 1 hr, 180° C. for 3 hr, and 190° C. for 5 hr to prepare epoxy/ZrP nanocomposites.

Characterization: Transmission electron microscopy (TEM) was performed using a JEOL JEM-2010 high-resolution transmission electron microscope, operated at an accelerating voltage of 200 kV. Energy-dispersive spectroscopy (EDS) was conducted on a FE-SEM (JEOL JSM-7500F). Optical micrographs (OM) were collected using an Olympus BX60 optical microscope. Grazing-incidence small-angle x-ray scattering (GISAXS) experiments were performed on a Rigaku S-Max 3000. Data were collected at a grazing incidence angle of 0.05 degree (Cu $K_\alpha$ radiation, λ=1.54056 Å). The oxygen transmission rate (OTR) of the films was evaluated using a MOCON OX-TRAN 2/21 in accordance with ASTM D3985. Before coating and corrosion testing, the Al surfaces were electrochemically polished in a solution of 10 vol. % $HClO_4$ and 90 vol. % ethanol at 0° C. using graphite as the counter electrode under an applied voltage of 23 V for 3 min. A three-electrode electrochemical cell was employed for potentiodynamic and EIS measurements. The exposed testing surface area with a diameter of 5 mm was kept the same in all tests. The electrochemical measurements were conducted using a Gamry Reference 600™ Potentiostat in 7 wt % NaCl solutions. After measurements, GamryEchem Analyst™ software was used to analyze potentiodynamic and EIS data.

Figure 1B:
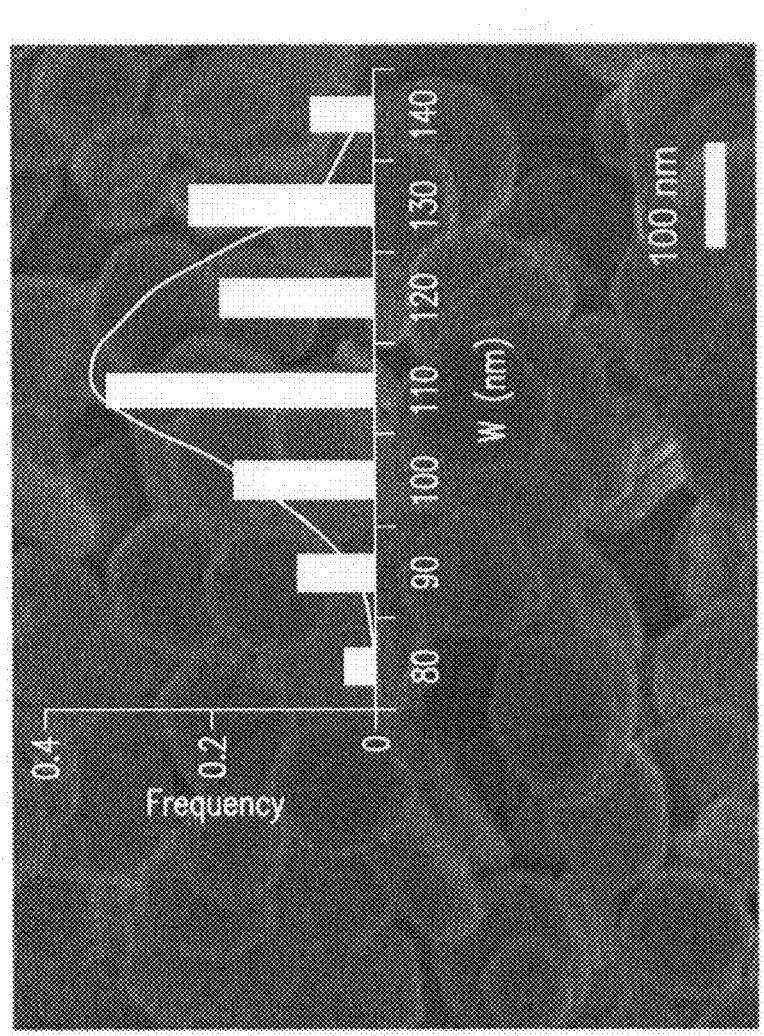
FIG. 1B shows SEM of ZrP nanoplatelets. Inset is the size distribution.
Figure 6:
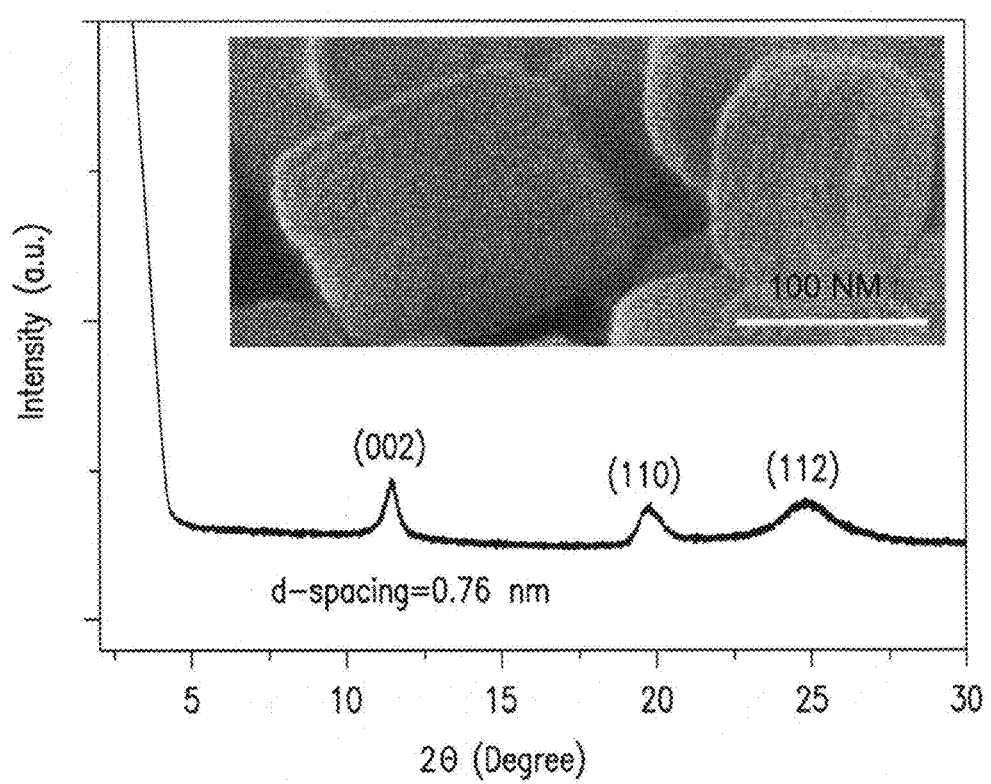
FIG. 6 shows XRD of pristine ZrP nanoplatelets. Inset is the SEM image of pristine ZrP stacks.

Our method achieves the formation of 2D lamellar-like nanostructures on a metal substrate as shown in FIG. 1A. Layered ZrP, namely $Zr(HPO_4)_2.H_2O$ with an average size of 110 nm (FIG. 1B), was synthesized using a hydrothermal method and exfoliated by a proton exchange reaction in acetone. The hexagonal ZrP nanoplatelets have strong covalent bonding along the primary plane but interact with neighboring platelets through out-of-plane van der Waals (vdW) and hydrogen bonding.[34] These interactions contribute to the formation of layered structures with a d-spacing of 0.76 nm for pristine ZrP stacks (FIG. 6). The P—OH functional groups on ZrP surfaces cause the nanoplatelets to be functionalized with proton donors (i.e., amines).[35] As a result, the individually exfoliated ZrP has a high aspect ratio of 160 nm in organic solvent. The ZrP was then physically mixed with epoxy precursor in acetone and spray-coated on a metal substrate. The spray coating technique allows for fast and efficient assembly of the smectic structures of ZrP under ambient conditions.

Figure 1D:
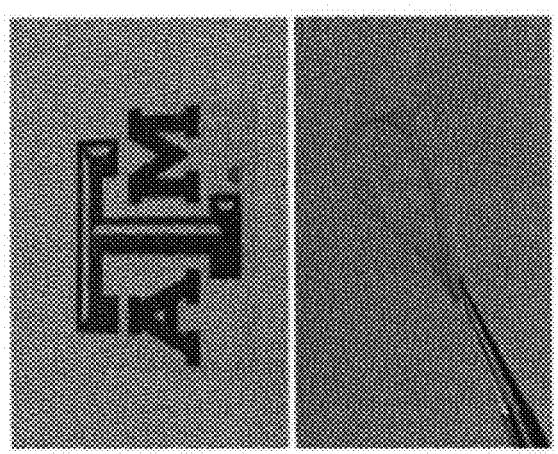
FIG. 1D shows a free-standing smectic epoxy/ZrP film with optical transparence and mechanical flexibility.
Figure 1C:
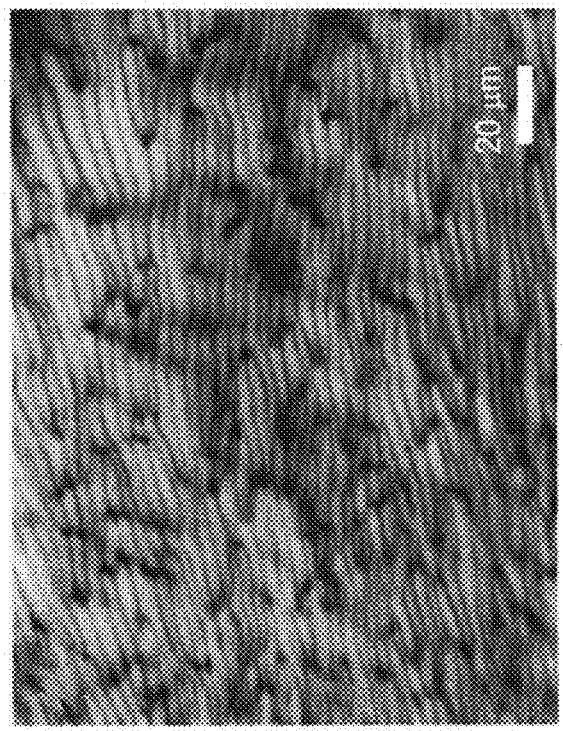
FIG. 1C shows a cross-polarized light optical micrograph (OM) of smectic epoxy/ZrP suspensions.
Figure 1E:
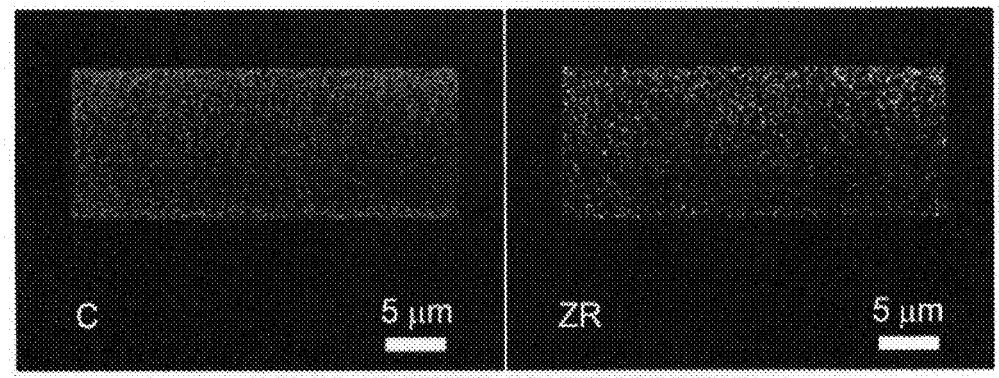
FIG. 1E shows EDS mapping including C element and Zr element.
Figure 1F:
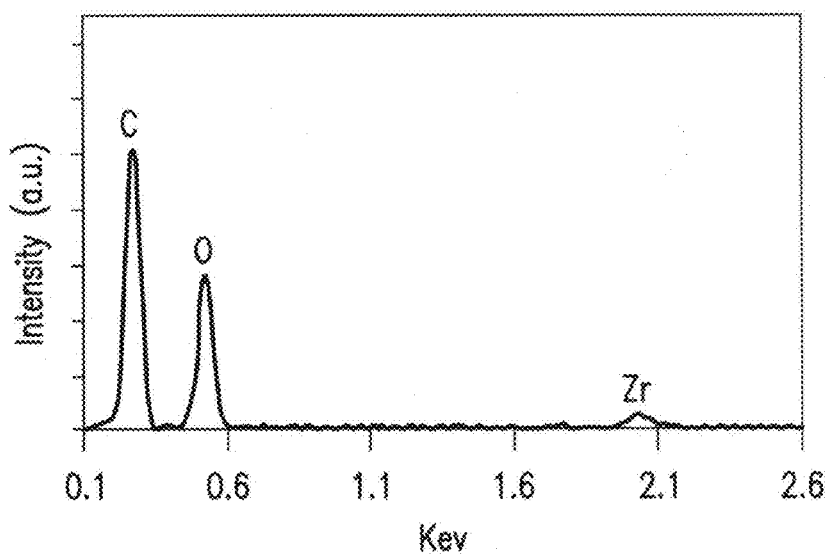
FIG. 1F shows EDS spectrum of cross-sectional smectic epoxy/ZrP film.
Figure 7:
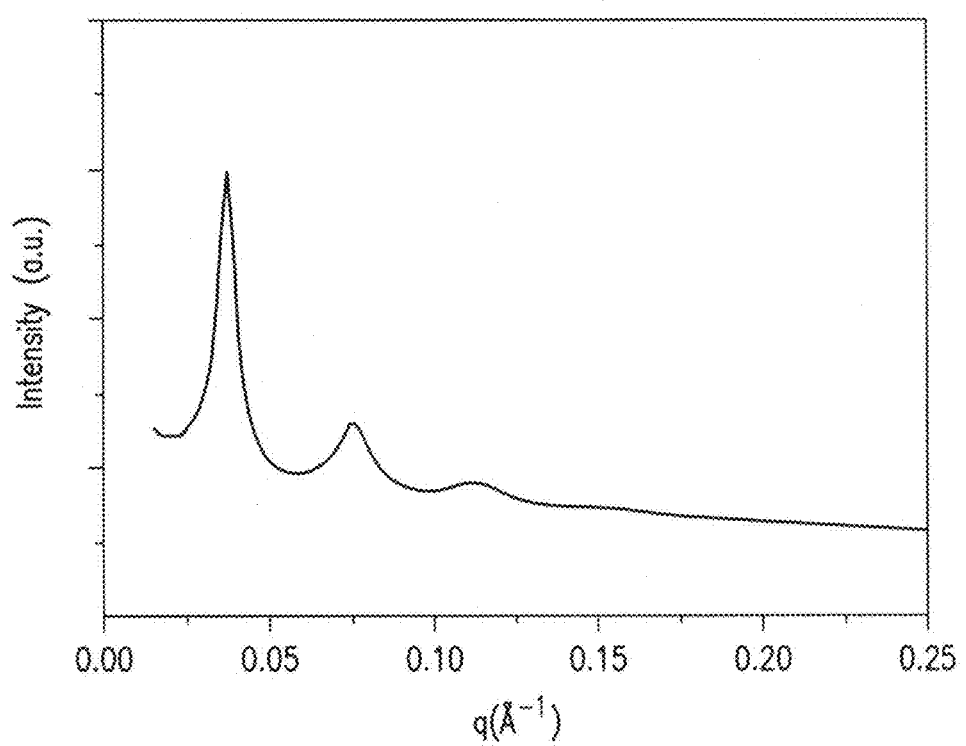
FIG. 7 shows SAXS diffractogram which confirms the lamellar structure of the smectic ZrP/epoxy suspension at 11 wt. %.
Figure 8:
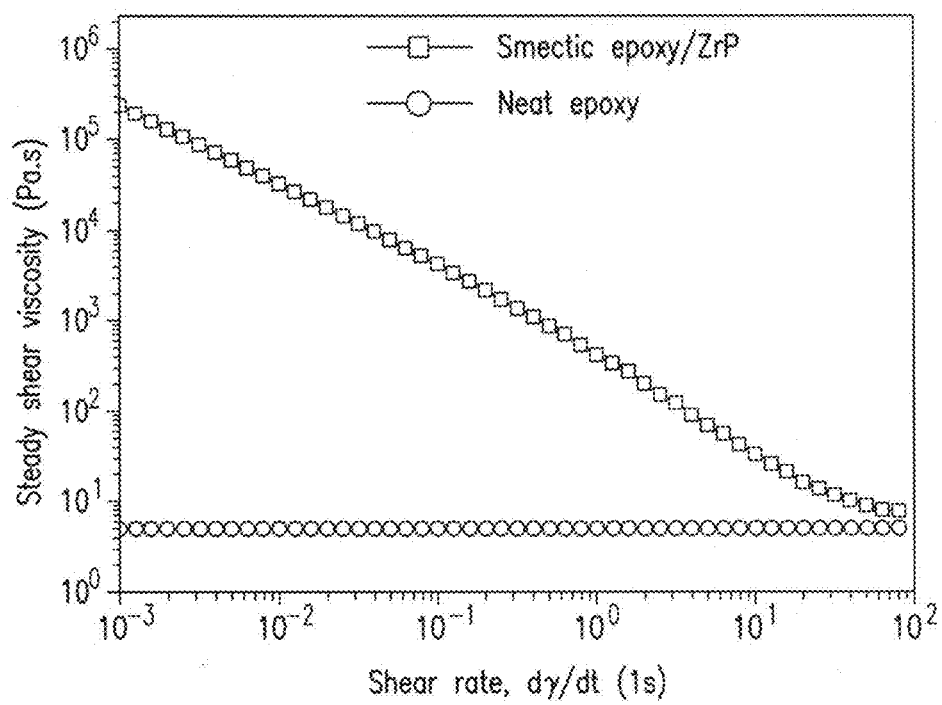
FIG. 8 shows viscosity as a function of shear rate for neat epoxy and smectic epoxy/ZrP suspensions (11 wt. %) without curing agent measured at 25° C.

The lyotropic behavior of the epoxy/ZrP (11 wt. %) suspensions without curing agent sandwiched between two glass plates can be observed under cross-polarized light (FIG. 1C), which demonstrates a band-like Grandjean texture.[36] 2D discotic suspensions, such as graphene oxide and clay,[37, 38] have been found to show distinct phases, including isotropic, nematic, columnar, and smectic phases. According to Onsager's theory,[39] high aspect ratio nanoparticles tend to form liquid crystals when their volume fraction in the suspension becomes larger than a critical value. This is due to a net gain in entropy as the loss of orientational entropy is compensated by an increase in translational entropy. Smectic phases are rarely seen and tend to be present only at high volume fractions[40] or when there are long range repulsive interactions between nanoplatelets.[41] SAXS measurement on suspensions containing a relative low amount of ZrP, i.e., 11 wt. %, displays a strong anisotropic pattern, suggesting a lamellar organization of ZrP in epoxy (FIG. 7). The free-standing epoxy/ZrP nanocomposite films possess high transparency and good mechanical flexibility (FIG. 1D). Energy dispersive spectroscopy (EDS) of the film cross-section shows a uniform distribution of ZrP in epoxy matrix (FIGS. 1E, 1F). Preparation of polymer nanocomposites with high filler content is challenging due to a drastic increase in viscosity. The smectic epoxy/ZrP liquids display extreme shear thinning behavior (FIG. 8). The extreme shear thinning property allows for the preparation of bulk polymer nanocomposites containing a high volume fraction of nanoplatelets using a simple fabrication process.

Figure 2A:
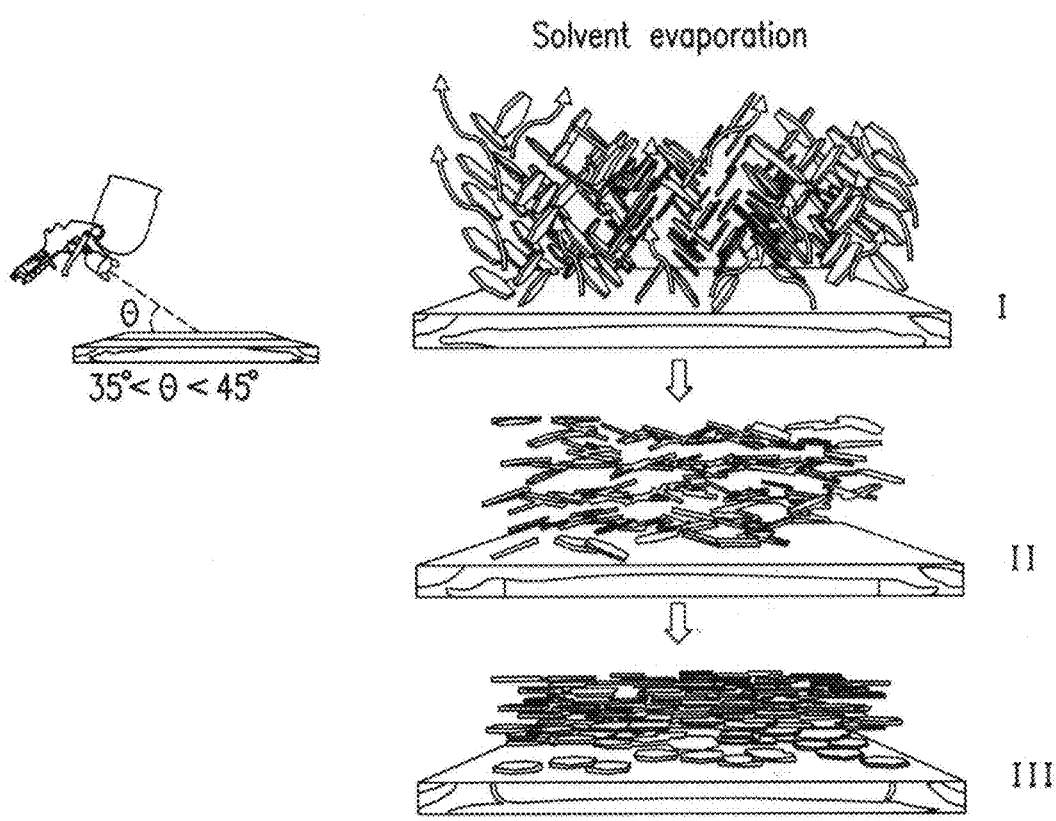
FIG. 2A shows a schematic of the self-assembly process of smectic epoxy/ZrP coating on a substrate by a spray-coating method.
Figure 2B:
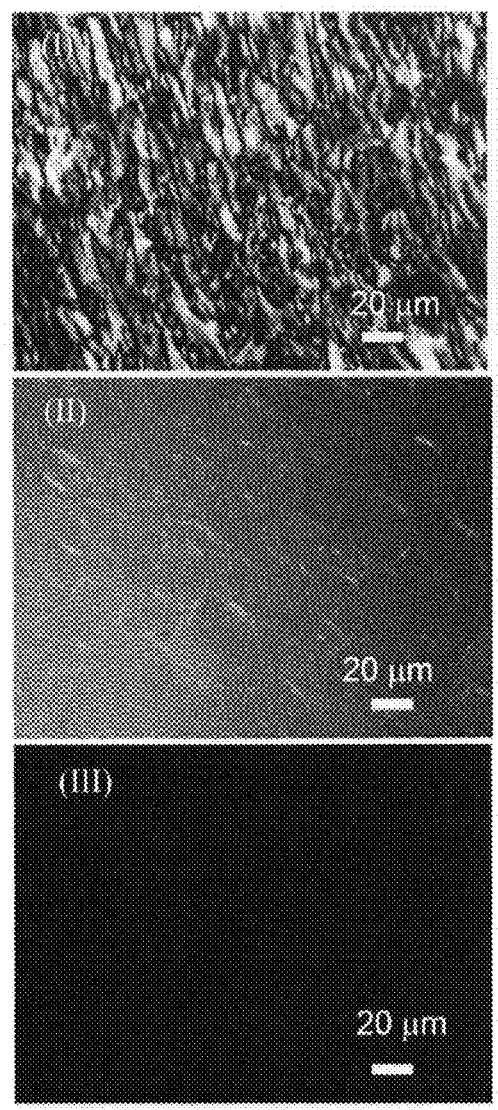
FIG. 2B shows the corresponding cross-polarized light OM of epoxy/ZrP coatings during different stages.

The self-assembly of the epoxy/ZrP coating is schematically shown in FIG. 2A. Firstly, the epoxy/ZrP precursor was transferred onto a substrate by spray-coating at a tilted angle. At stage I immediately after spray-coating, ZrP nanoplatelets show a low level of alignment in epoxy matrix due to acetone dilution. After drying at 40° C. for 2 hrs and 90° C. for 2 hrs, the ZrP tends to align parallel to the substrate possibly due to a decrease in solvent evaporation-induced capillary forces.[42] Depletion interactions could be also another factor here, which have been reported to induce formation of liquid crystalline phases in colloid/polymer mixtures.[43] Curing at an elevated temperature is the last stage (III). Well-aligned nanoplatelets in smectic order parallel to the substrate are obtained in the final stage. Under cross-polarized light (FIG. 2B), the epoxy/ZrP coating shows obvious birefringence at the initial stages. The featureless black image after curing indicates the ZrP nanoplatelets are self-assembled parallel to the substrate.

Figure 3A:
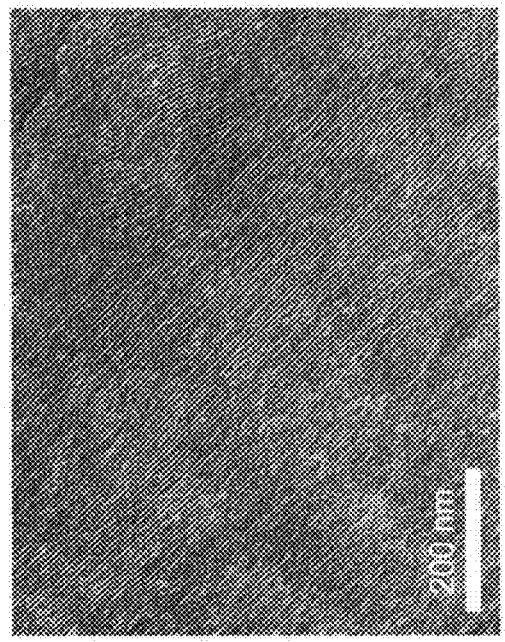
FIGS. 3A and 3B show TEM of cross-section of smectic epoxy/ZrP coating.
Figure 3B:
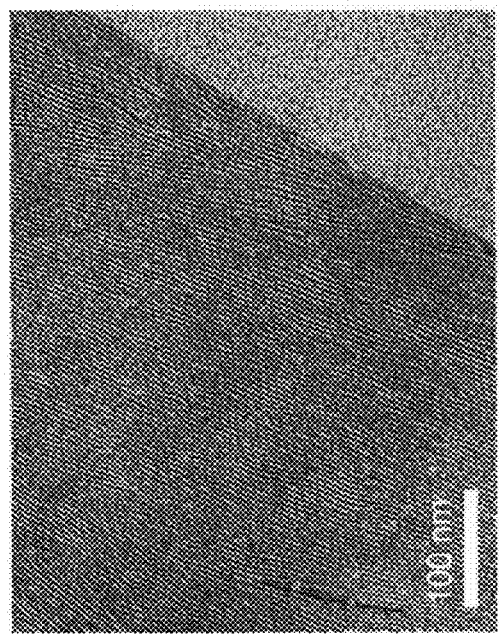
Figure 3D:
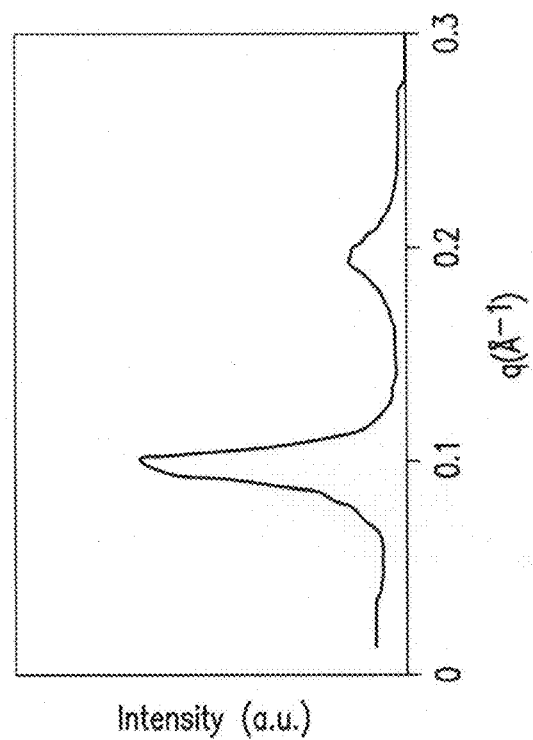
FIGS. 3C and 3D show 2D and 1D diffractograms of GISAXS, suggesting ZrP nanoplatelets are aligned parallel to the substrate.
Figure 3C:
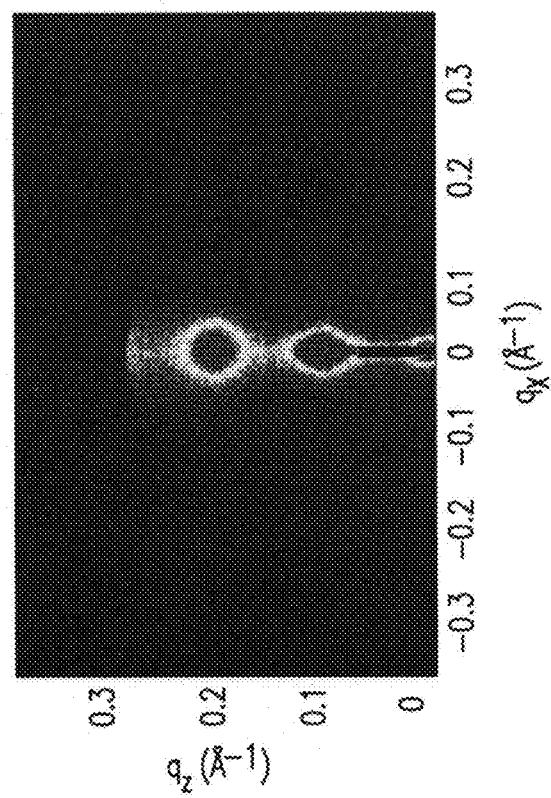

The mesomorphic structure of the epoxy/ZrP coating on a metal substrate was further investigated using TEM and GISAXS. TEM images of the epoxy/ZrP (11 wt. %) coating show the long-range orientational and positional order of the self-assembled ZrP nanoplatelets in smectic phases (FIGS. 3A, 3B). For GISAXS results, lamellar structures that are aligned parallel to the substrate display Bragg peaks along the vertical axis ($q_z$-axis); Peaks present along the horizontal plane ($q_x$-axis) indicate a perpendicular alignment to the substrate. The Bragg peaks obtained from GISAXS 2D pattern (FIG. 3C) appear exclusively in the $q_z$-axis, indicating that the smectic ZrP nanoplatelets are dominantly aligned parallel to the substrate. GISAXS 1D spectrum of smectic epoxy/ZrP (11 wt. %) films displays characteristic peaks for the lamellar phase with a d-spacing of 6.1 nm (FIG. 3D). The creation of such smectic structures on a metal surface is likely the main cause for the enhanced anti-corrosion performance.

Figure 4A:
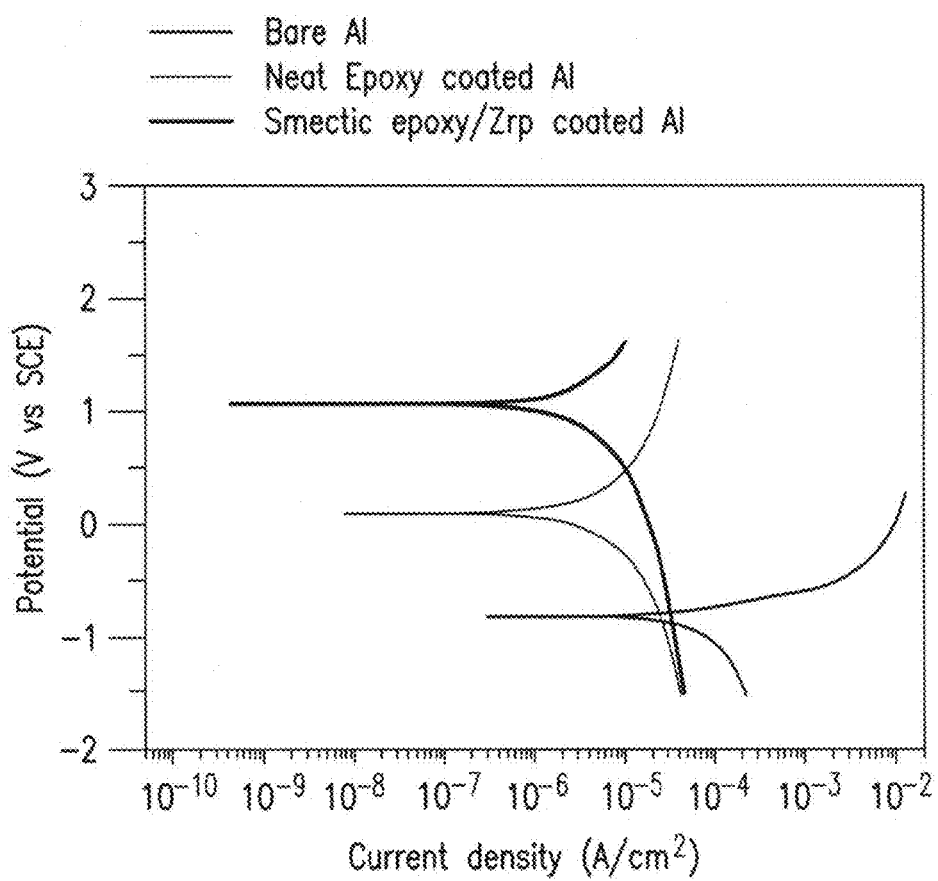
FIG. 4A shows a potentiodynamic polarization result.

To investigate the corrosion resistance of the coatings, potentiodynamic measurements were conducted (FIG. 4A). Two important parameters, corrosion potential ($E_{corr}$) and corrosion current density ($I_{corr}$) were measured to determine corrosion resistance. $E_{corr}$ is the measure of corrosion susceptibility,[44] and a positive shift in $E_{corr}$ indicates increased corrosion resistance. $I_{corr}$ represents the intensity of the cathodic oxygen reduction and anodic dissolution of metal ions.[45] It was observed that the aluminum alloy (Al) substrate had an $E_{corr}$ of −0.825 V. Coating the Al substrate with epoxy and epoxy/ZrP increased the $E_{corr}$ to 0.102 V and 1.068 V, respectively. At the same time, $I_{corr}$ was found to be decreased from 29.41 μA/cm² for the bare Al, to 1.98 μA/cm2 for the neat epoxy-coated Al, and finally to 0.36 μA/cm² for the smectic epoxy/ZrP-coated Al. Table 1 summarizes $E_{corr}$, $I_{corr}$ and corrosion rate (CR, Equation S4) for various sample systems. Compared to the neat epoxy coated Al, the $E_{corr}$ of the smectic epoxy/ZrP-coated Al increased by 950% and the $I_{corr}$ has been reduced by 80%. Table S1 compares the anti-corrosion properties for various other polymer nanocomposite coatings found in the literature. The anti-corrosion performance of the smectic epoxy/ZrP coating is among the best to-date. The smectic epoxy/ZrP coating reported here demonstrates promising potential for anti-corrosion applications.

TABLE 1

Electrochemical corrosion properties of bare Al, neat epoxy coated Al, and smectic epoxy/ZrP coated Al. $E_{corr}$ and $I_{corr}$ were determined from a polarization curve using the Tafel extrapolation method.

| | $I_{corr}$ (μA/cm²) | $E_{corr}$ (V) | CR (mm year$^{-1}$) |
|---|---|---|---|
| Bare Al | 29.41 | −0.825 | 3.21 × 10$^{-1}$ |
| Neat epoxy-coated Al | 1.98 | 0.102 | 2.16 × 10$^{-2}$ |
| Smectic epoxy/ZrP-coated Al | 0.36 | 1.068 | 3.93 × 10$^{-3}$ |

Equation S4: The CR (mm per year) was calculated using the following equation [S17].

$$CR(\text{mm year}^{-1}) = \frac{Icorr(\text{A/cm}^3) \cdot M(g)}{D(\text{g/cm}^3) \cdot V} \times 3270$$

where $I_{corr}$ is the corrosion current density, M is the molecular mass, V is the number of electrons transferred in the corrosion reaction (V=3), 3270 is a constant, and D is the density of protected metal.

TABLE S1

Summary of anti-corrosion properties of various polymer nanocomposites obtained from literature.

| Anticorrosion Coating | Filler Loading | Testing solution | Coating Thickness | $I_{corr}$ Decrease | $E_{corr}$ Increase | Citation |
|---|---|---|---|---|---|---|
| Example 1 | 11 wt. % | 7 wt. % NaCl | 14 μm | 80% | 950% | Example 1 |
| Epoxy/MMT | 5 wt. % | 5 wt. % NaCl | 34 μm | 94% | 17% | Ref. [S1] |

TABLE S1-continued

Summary of anti-corrosion properties of various polymer nanocomposites obtained from literature.

| Anticorrosion Coating | Filler Loading | Testing solution | Coating Thickness | $I_{corr}$ Decrease | $E_{corr}$ Increase | Citation |
|---|---|---|---|---|---|---|
| PANI/MMT | 1 wt. % | 3.5 wt. % NaCl | NA | 15% | 3% | Ref. [S2] |
| Epoxy/MMT | 3 wt. % | 5 wt. % NaCl | 60 μm | 63% | 19% | Ref. [S3] |
| Epoxy/Glass | 3 wt. % | 5 wt. % NaCl | 70 μm | 86% | 53% | Ref. [S3] |
| PANI/Graphene | 0.5 wt. % | 3.5 wt. % NaCl | 31 μm | 63% | 10% | Ref. [S4] |
| PANI/Clay | 0.5 wt. % | 3.5 wt.% NaCl | 29 μm | 90% | 17% | Ref. [S4] |
| Epoxy/SiO2 | 3 wt. % | 5 wt. % NaCl | 23 μm | 95% | 34% | Ref. [S5] |
| PS/GO | 1.5 wt. % | 3.5 wt. % NaCl | 27 μm | 99% | 48% | Ref. [S6] |
| Epoxy/Graphene | 1 wt. % | 3.5 wt. % NaCl | 115 μm | 90% | 39% | Ref. [S7] |
| Epoxy/Clay | 5 wt. % | 3.5 wt. % NaCl | 30 μm | 33% | 16% | Ref. [S8] |
| PI/Clay | 3 wt. % | 3.5 wt. % NaCl | 25 μm | 56% | 34% | Ref. [S9] |
| PI/SiO2 | 5 wt. % | 3.5 wt. % NaCl | NA | 70% | 25% | Ref. [S10] |
| Epoxy/SiO2 | 1.4 wt. % | 3.5 wt. % NaCl | 50 μm | 99% | 10% | Ref. [S11] |
| Polybenzoxazine/SiO2 | 5 wt. % | 3.5 wt. % NaCl | 5 μm | NA | 31% | Ref. [S12] |

Note:
The values of $I_{corr}$ decrease and $E_{corr}$ increase are defined as follows: $I_{corr}$ decrease = $(I_{corr\ neat\ polymer} - I_{corr\ nanocomposite})/I_{corr\ neat\ polymer}$, $E_{corr}$ increase = $(E_{corr\ nanocomposite} - E_{corr\ neat\ polymer})/E_{corr\ neat\ polymer}$.

Figure 4B:
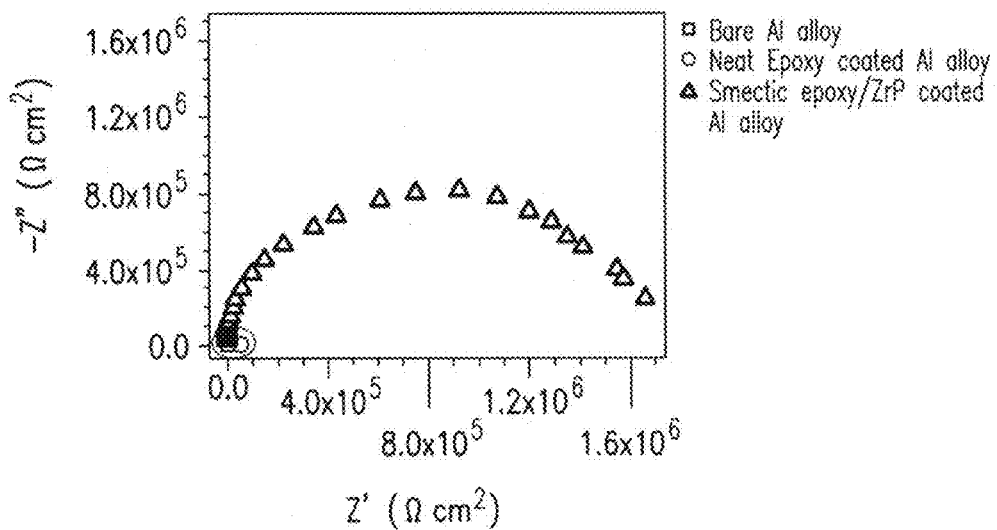
FIGS. 4B, 4C and 4D show Nyquist plots.
Figure 4C:
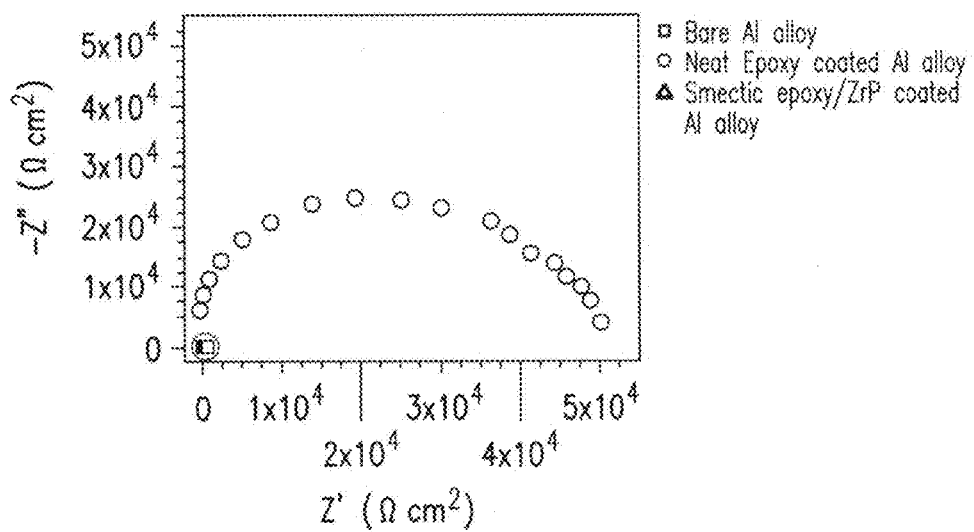

Electrochemical impedance spectroscopy (EIS) experiments were also carried out to better understand the underlying mechanisms responsible for the improved corrosion resistance. The magnitude of the impedance was determined to assess the resistance of the coating to the transportation of electrons and charges. Differences of several orders of magnitude in impedance were observed from the Nyquist plots (FIGS. 4B, 4C, 4D), which clearly show that the impedance of smectic expoxy/ZrP coating is about 100-fold and 10,000-fold larger than those of the neat epoxy coating and bare Al substrate, respectively.

Figure 4D:
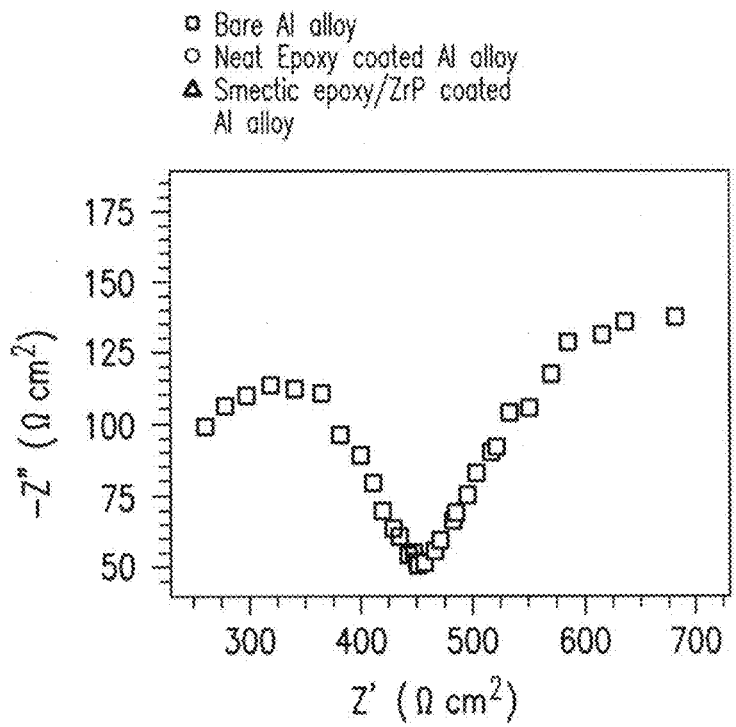
Figure 4E:
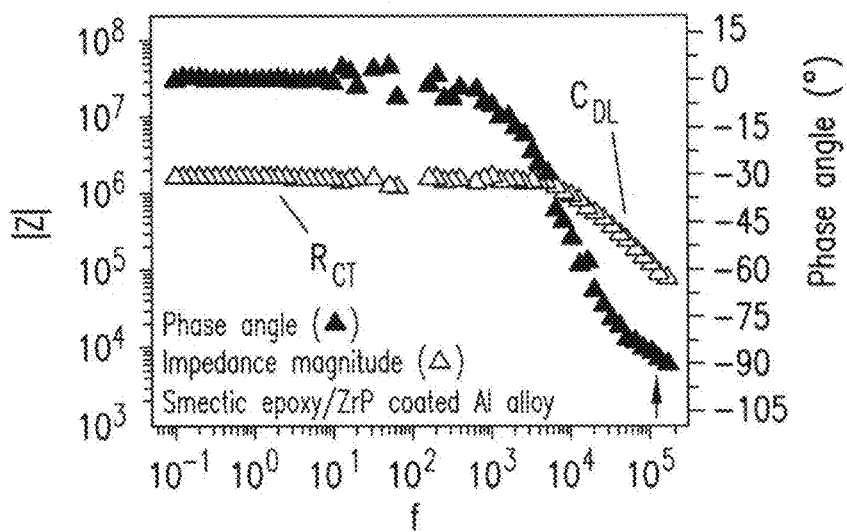
FIGS. 4E, 4F and 4G show Bode plots of bare Al alloy, neat epoxy, and smectic epoxy/ZrP-coated Al alloy.
Figure 4F:
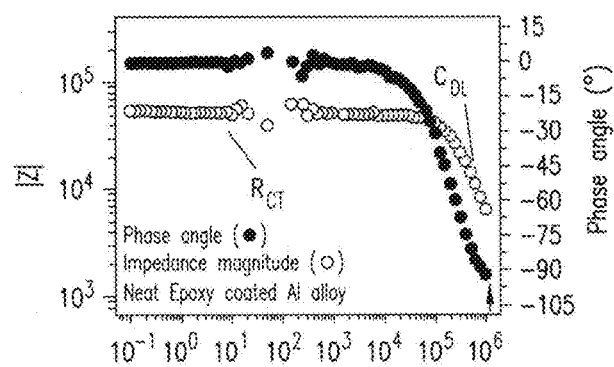
Figure 4G:
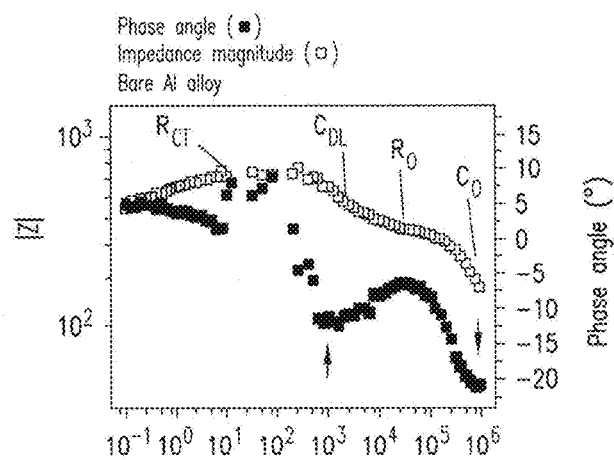

The corresponding Bode plots are shown in FIGS. 4E, 4F, 4G. Faradic current-induced charge transfer can be represented by the resistor component ($R_{CT}$) in FIGS. 4E, 4F without phase delay (phase angle=0). Surface charging due to the formation of a double layer (DL) can be denoted by the capacitor component ($C_{DL}$) with a negative phase angle (see arrows in FIGS. 4E, 4F). Charge transfer and DL charging are the two major electrochemical processes that occur during the corrosion of epoxy-coated Al. On the bare Al surface, oxidation of the metal is necessary to corrode the Al. Extra oxide components of resistor ($R_O$) and capacitor ($C_O$) are observed from the Bode plots (FIG. 4(g)) in addition to the $R_{CT}$ and $C_{DL}$. This is consistent with the two continuous semicircles in the corresponding Nyquist plot (FIG. 4D). The phase delays associated with the two capacitor components are also indicated by the two arrows in FIG. 4G. Therefore, the largest impedance on the smectic epoxy/ZrP-coated Al is the result of difficulties in charge (e.g., electrons and ions) transfer and the inhibition of surface charging. The significant increase in $E_{corr}$ and reduction in $I_{corr}$ are caused by the repression in charge transfer and surface charging.

Metal corrosion involves destructive oxidative attacks caused by electrochemical reactions. In the case of the Al substrate, the corrosion process comprises anodic metal oxidization that releases soluble $Al^{3+}$ ions and cathodic $O_2$ reduction reactions that consume the electrons created from the anodic reaction. These two reactions complement each other. Inhibition of one of the two reactions will prevent or slow down the overall corrosion process. For metal corrosion to occur, electroactive species must penetrate through the coating. Therefore, a coating that inhibits oxygen permeation may lead to significantly improved corrosion resistance.

Figure 5A:
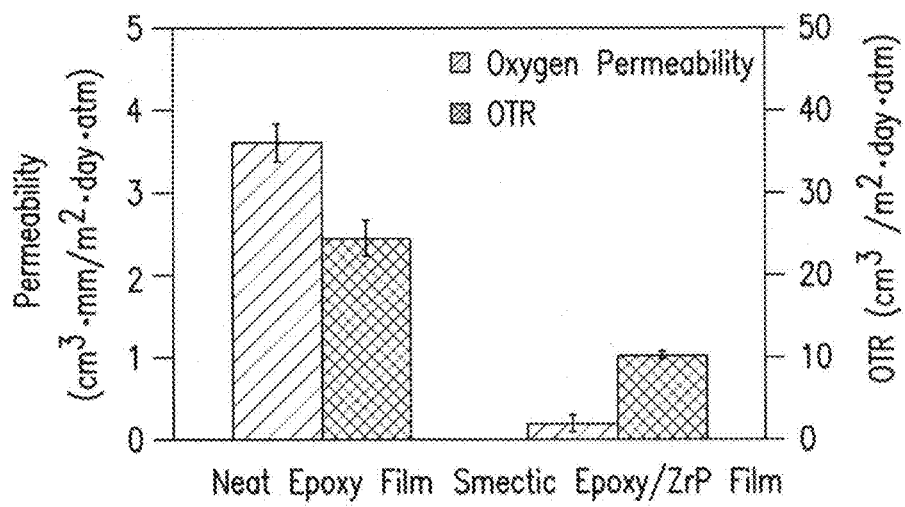
FIG. 5A shows an oxygen transmission rate (OTR) and permeability of neat epoxy and smectic epoxy/ZrP films tested under relative humidity of 50 RH % at 23° C.
Figure 5B:
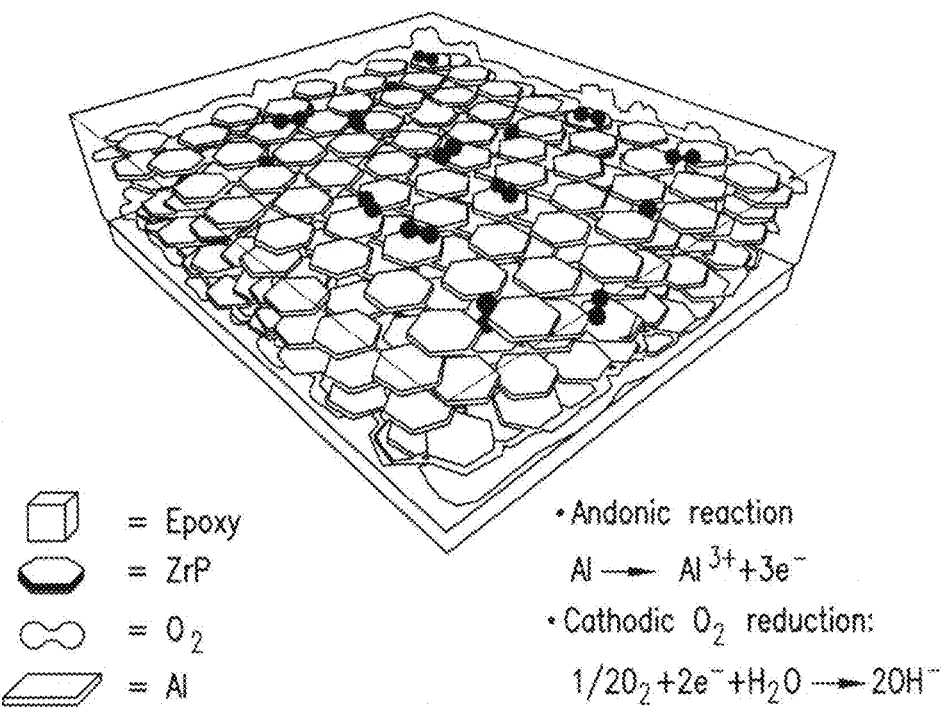
FIG. 5B shows a schematic of the improved barrier performance of oxygen.
Figure 9:
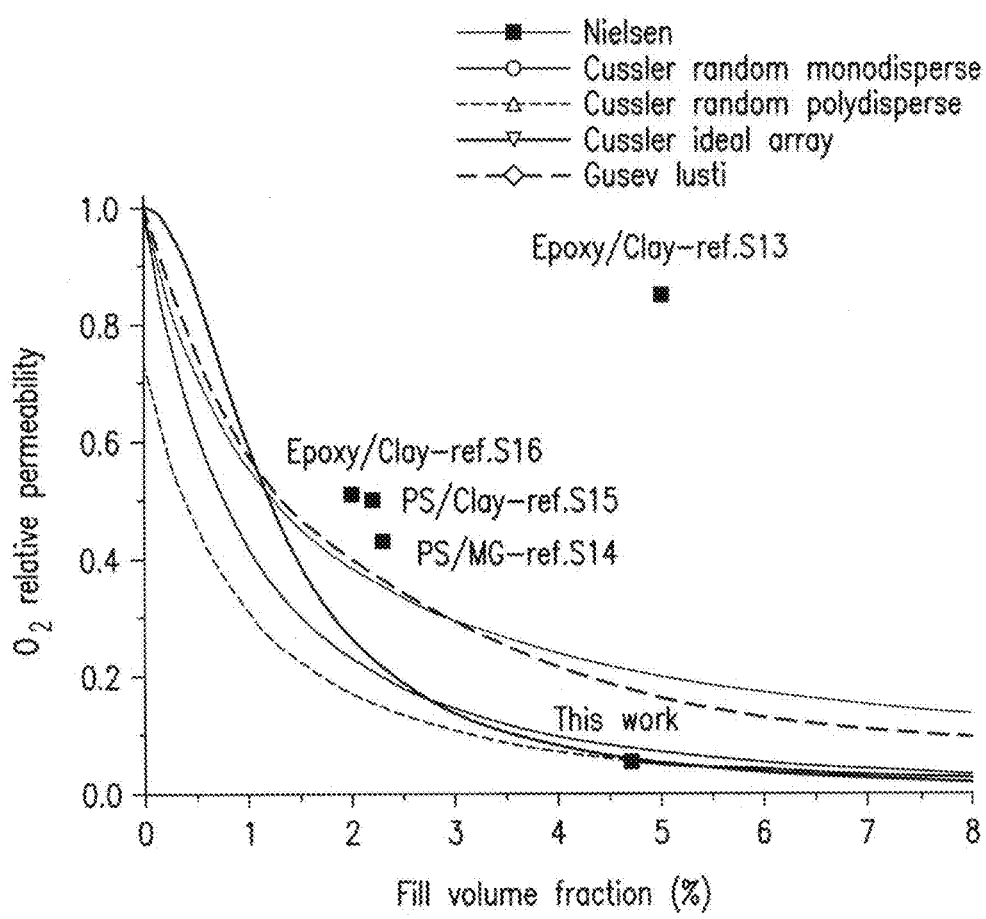
FIG. 9 shows oxygen relative permeability of smectic epoxy/ZrP films and compared with previous experimental results and fit with various models prediction.

The oxygen transmission rate (OTR) and permeability of the neat epoxy and smectic epoxy/ZrP films are shown in FIG. 5A. The significant reduction of oxygen permeability was observed for the spray-coated smectic ZrP/epoxy film. Compared with the neat epoxy film with a thickness of ~130 μm, a 20-fold reduction in oxygen permeability is achieved with only a ~12 μm thick smectic ZrP/epoxy film at a relative humidity of 50%. Model predictions and previous experimental data of gas permeability based on polymer/2D platelets are compared (FIG. 9).

Figure 10:
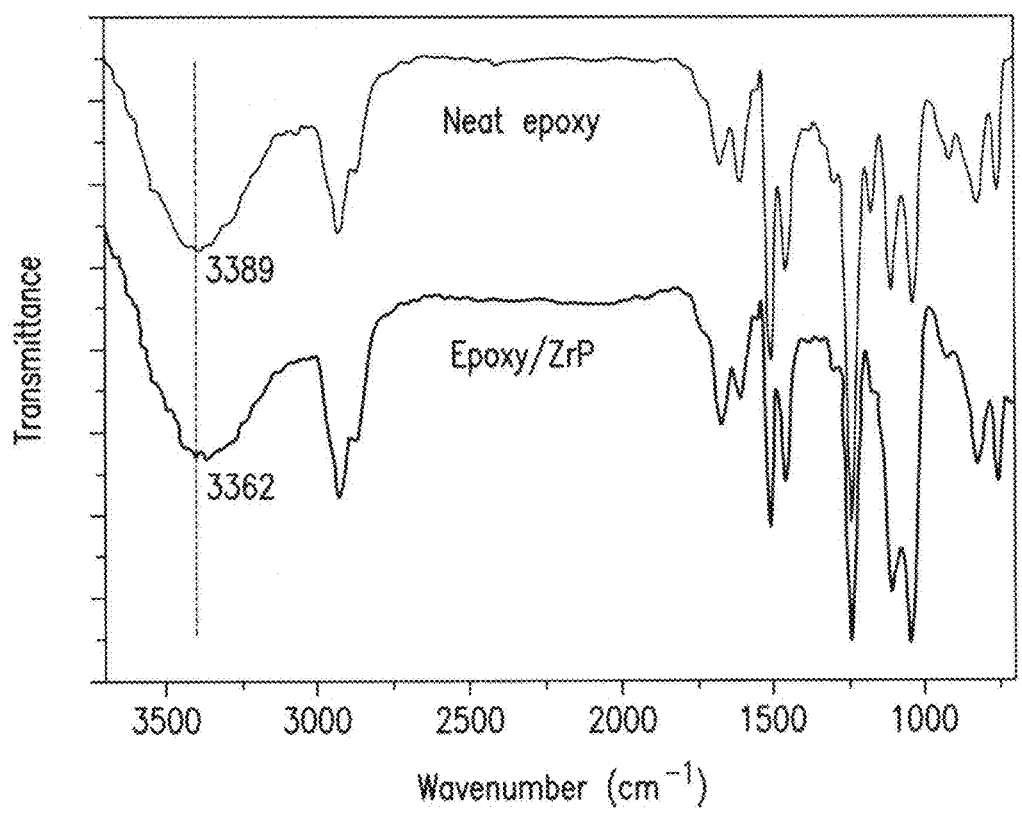
FIG. 10 shows Fourier-Transform Infrared spectra (FTIR) of neat epoxy and smectic epoxy/ZrP nanocomposites.

Low oxygen permeability also indicates good interfacial bonding between ZrP and epoxy, which is due to favorable hydrogen bonding between these two components. After curing, there are numerous ether and hydroxyl groups in epoxy segments that can form hydrogen bonds with the hydroxyl-terminated functional groups on the ZrP surface. Evidence for hydrogen bonding between ZrP and epoxy was found from the FTIR spectra of neat epoxy and epoxy/ZrP nanocomposites (FIG. 10), where the absorption peak of —OH stretching shifts from 3389 $cm^{-1}$ to 3362 $cm^{-1}$. In general, a lower wavenumber in FTIR indicates a stronger hydrogen bonding interaction.[47] The adhesion of the coatings was also evaluated based on a standard method (ASTM D 3359-02). There was no detectable peeling of the smectic epoxy/ZrP coatings (FIGS. 11A and 11B). The observed improvement in $E_{corr}$ for the smectic epoxy/ZrP coating is likely attributed to its electrochemical stability and molecularly impermeable smectic architecture.

In summary, we demonstrate the excellent metal anti-corrosion performance of a sprayable epoxy coating containing ZrP in long-range smectic order for the first time. These coatings effectively prevent the permeation of aggressive oxygen, disrupting the corrosion process. The potentiodynamic polarization and EIS experiments quantitatively demonstrate that these smectic epoxy/ZrP coatings can remarkably improve the corrosion resistance of an Al substrate. Such high-performance epoxy nanocomposites are suitable for large-scale anti-corrosion and barrier film applications.

As mentioned above, the anti-corrosion epoxy coatings containing self-assembled α-zirconium phosphate nanoplatelets that are capable of forming a smectic order can be used in a facile and scalable spray-coating approach. These ZrP-containing epoxy coatings exhibit long-range order with platelet orientation parallel to the metal surface. The ordered ZrP nanoplatelets act as highly effective barrier layers to prevent electroactive species, such as water and oxygen, from reaching the metal surface. Electrochemical analyses reveal an improvement against corrosion by as much as an order of magnitude when compared with the neat epoxy coating counterpart. Therefore, the technique present here can be useful to effectively protect metal from corrosion.

Physical properties were determined as follows.
(Transparency)
Transparancy as total light transmittance and haze was measured by using HZ-V3 (Suga Test Instruments Co., Ltd.), in conformity with JIS K 7361-1 and JIS K 7136.
(Water Vapor/Moisture Transmission Rate)
Moisture transmission rate was measured by using GTR-30XACK Gas/Water Vapor permeation tester (GTR Tec Co. Ltd.), in conformity with JIS K 7126-1. Oxygen transmission rate was measured by using BT-3 Gas Transmisstion Rate Tester (Toyoseiki Seisaku-sho, Ltd.), in conformity with JIS K 7126-1.

Example 2

12.0 g of zirconium phosphate (CZP-100, Daiichi Kigenso Kagaku Kogyo Co., Ltd.) dried at 200° C. for 2.5 hours in advance was added to a solvent mixture of 714.5 mL of methanol and 45.6 mL of distilled water. Also, 23.9 g of polyetheramine (JEFFAMINE M-1000, HUNTSMAN) was mixed with 37.5 mL of methanol and 2.4 mL of distilled water. This polyetheramine solution was added to the zirconium phosphate mixture, and the mixture was further stirred continuously. Then, the mixture was sonicated using US-5R (AS ONE Corp.) for 30 minutes, to obtain exfoliated, oligomer modified zirconium phosphate (ZrP) nanoplatelets dispersed in methanol/water.

This oligomer modified ZrP dispersion was heated under reduced pressure using a rotary evaporator at 50° C. and 175 Torr, to remove about one-third of the solvent therein. The same volume of methanol as that of the removed solvent was added to the concentrated zirconium phosphate dispersion, and the same treatment was repeated three times. Finally, 480.0 g of modified ZrP nanoplatlet dispersion was obtained in which most part of the dispersion medium was methanol and the concentration of the zirconium phosphate was 2.5 wt %.

Next, 120.0 g of the modified ZrP dispersion was mixed with 9.0 g of isobornyl acrylate (hereinafter, referred to as IBOA), 5.0 g of trimethylolpropane triacrylate which was ethoxylated (coupled with 3 mol ethylene oxide) (hereinafter, referred to as EO3TMPTA), and 6.0 g of epoxy acrylate (CN120, SARTOMER). The mixture was then concentrated using a rotary evaporator at 40° C. and 90 Torr, thereby providing 82.8 g of mixture having a solids content of 35 wt %. The resulting mixture was mixed thoroughly with 1 g of 1-hydroxycyclohexylphenylketone and 0.03 g of a leveling agent (TEGO Rad2100, Evonik Industries AG), thereby providing photo-curable coating composition.

This coating composition was cast on a polyethylene terephthalate film (hereinafter, referred to as a PET film) and leveled using a bar coater so as to allow the film after curing to have a uniform thickness of about 30 to 50 micrometers. This PET film having the coating composition was dried at 50° C. for 60 minutes to remove the solvent. Then, this PET film having the coating was exposed to UV lamp (ECS-301, EYE GRAPHICS CO., LTD.) to cure the coating composition under an accumulated light quantity of 1000 mJ/cm$^2$ using a 120 W/cm metal halide lamp. After cured, the resulted coating product was peeled off from the PET film, thereby providing a free-standing film.

The content of zirconium phosphate in the free-standing film was 10 wt %. The free-standing film had a total light transmittance of 91.5%, a haze of 2.3% and oxygen transmission rate of $8.1*10^{-14}$ mol*Pa$^{-1}$*m$^{-2}$*s$^{-1}$ and permeability coefficient for oxygen of $3.6*10^{-18}$ mol*m*Pa$^{-1}$*m$^{-2}$*s$^{-1}$.

Comparative Example 1

First, 9.0 g of IBOA, 5.0 g of EO3TMPTA, 6.0 g of epoxy acrylate (CN120), 1 g of 1-hydroxycyclohexylphenylketone, and 0.02 g of a leveling agent (TEGO Rad2100, Evonik Industries AG) were mixed thoroughly with each other, thereby providing a photo-curable coating composition containing no inorganic nanoplatelets.

A free-standing film containing no inorganic nanoplatelets was then produced in the same manner as in Example 2 except that the drying time for the coating in Example 2 was skipped. The free-standing film had a total light transmittance of 91.3%, a haze of 0.8% and oxygen transmission rate of $1.7*10^{-12}$ mol*Pa$^{-1}$*m$^{-2}$*s$^{-1}$ and permeability coefficient for oxygen of $7.1*10^{-17}$ mol*Pa$^{-1}$*m$^{-2}$*s$^{-1}$.

Example 3

A photo-curable coating composition and a free-standing film formed therefrom were produced in the same manner as in Example 2 except that 9.0 g of IBOA, 5.0 g of EO3TMPTA and 6.0 g of epoxy acrylate (CN120) in Example 2 were replaced by 12.0 g of IBOA, 2.0 g of trimethylolpropane triacrylate (hereinafter, referred to as TMPTA) and 6.0 of urethane acrylate (CN986, SARTOMER).

The content of zirconium phosphate in the free-standing film was 10 wt %. The free-standing film had a total light transmittance of 92.1%, haze of 4.3% and oxygen transmission rate of $7.8*10^{-13}$ mol*Pa$^{-1}$*m$^{-2}$*s$^{-1}$ and permeability coefficient for oxygen of $2.7*10^{-17}$ mol*m*Pa$^{-1}$*m$^{-2}$*s$^{-1}$.

Example 4

A photo-curable coating composition and a free-standing film formed therefrom were produced in the same manner as in Example 2 except that 9.0 g of IBOA, 5.0 g of EO3TMPTA, and 6.0 g of epoxy acrylate (CN120) in Example 2 were replaced by 9.2 g of IBOA, 4.8 g of EO3TMPTA, and 6.0 g of a urethane oligomer (CN9011, SARTOMER).

The content of zirconium phosphate in the free-standing film was 10 wt %. The free-standing film had a total light transmittance of 91.8%, a haze of 1.3%.

Example 5

A photo-curable coating composition and a free-standing film formed therefrom were produced in the same manner as in Example 2 except that 9.0 g of IBOA, 5.0 g of EO3TMPTA, and 6.0 g of epoxy acrylate (CN120) in Example 2 were replaced by 7.6 g of IBOA, 6.4 g of tripropylene glycol diacrylate (hereinafter, referred to as TPGDA), and 6.0 of urethane acrylate (CN959, SARTOMER).

The content of zirconium phosphate in the free-standing film was 10 wt %. The free-standing film had a total light transmittance of 92.0%, a haze of 1.8.

Comparative Example 2

A photo-curable coating composition containing no inorganic nanoplatelets and a free-standing film formed therefrom were produced in the same manner as in Comparative Example 1 except that 9.0 g of IBOA, 5.0 g of EO3TMPTA, and 6.0 g of epoxy acrylate (CN120) in Comparative Example 1 were replaced by 12.0 g of IBOA, 2.0 g of TMPTA, and 6.0 g of urethane acrylate (CN986).

The free-standing film had a total light transmittance of 92.0%, a haze of 1.0% and oxygen transmission rate of $6.7*10^{-12}$ mol*$Pa^{-1}$*$m^{-2}$*$s^{-1}$ and permeability coefficient for oxygen of $2.4*10^{-16}$ mol*m*$Pa^{-1}$*$m^{-2}$*$s^{-1}$.

Table 2 collectively shows the compositions of the main components and the experimental results in Examples 2 to 5 and Comparative Examples 1 and 2.

The liquid crystal behavior of ZrP in solvents with a concentration of 5.2 wt. % was studied using cross-polarized optical microscopy and SAXS. The strong birefringence indicates that there is long-range organization of the ZrP nanoplatelets into a liquid crystalline mesophase (FIGS. 13A-13F). As shown in FIGS. 14A-14F, the microstructure of oligomer modified ZrP suspensions was characterized using SAXS. The results show a clear anisotropic scattering pattern, suggesting presence of lamellar organization of ZrP in both organic and aqueous solvents.

We found a facile and scalable spray-coating approach to prepare epoxy coatings that contain self-assembled α-zirconium phosphate (ZrP) nanoplatelets in smectic order. These ZrP-containing epoxy coatings exhibit long-range order with platelets organized in discrete layers aligned parallel to the substrate. In this work, we have confirmed that the spray-coating approach can be used to deposit an ordered mesophase of ZrP nanoplatelets on a metal substrate. Nearly an order of magnitude improvement in corrosion resistance is observed by Electrochemical analysis when compared with an Al substrate coated with the unfilled epoxy alone. Cross-polarized light optical microscopy and small-angle X-ray scattering (SAXS) show that the exfoliated ZrP could form a highly oriented smectic phase in various solvents, which further broadens the practical application of the present approach.

The solvents may be those having a dielectric constant of 2 or greater, for example, xylene.

REFERENCE

[1] G. H. Koch, M. P. Brongers, N. G. Thompson, Y. P. Virmani, J. H. Payer, *U S. Department of Transportation, Federal Highway Administration*, Washington D.C., 2001.

[2] M. Rohwerder, A. Michalik, *Electrochim. Acta* 2007, 53, 1300.

TABLE 2

| | Composition of matrix polymer (wt. %) | | | | | | Content of zirconium phosphate (wt %) | Total light transmittance (%) | Haze (%) | Oxygen transmission rate (mol/m²/s/Pa) | permeability coefficient of oxygen (mol · m/m²/s/Pa) |
|---|---|---|---|---|---|---|---|---|---|---|---|
| Example 2 | IBOA | 45 | EO3TMPTA | 25 | CN120 | 30 | 10 | 91.5 | 2.3 | $8.1 \times 10^{-14}$ | $3.6 \times 10^{-18}$ |
| Example 3 | IBOA | 60 | TMPTA | 10 | CN986 | 30 | 10 | 92 | 4.3 | $7.8 \times 10^{-13}$ | $2.7 \times 10^{-17}$ |
| Example 4 | IBOA | 46 | EO3TMPTA | 24 | CN9011 | 30 | 10 | 91.8 | 1.3 | — | — |
| Example 5 | IBOA | 38 | TPGDA | 32 | CN959 | 30 | 10 | 92 | 1.8 | — | — |
| Comparative Example 1 | IBOA | 45 | EO3TMPTA | 25 | CN120 | 30 | 0 | 91.3 | 0.8 | $1.7 \times 10^{-12}$ | $7.1 \times 10^{-17}$ |
| Comparative Example 2 | IBOA | 60 | TMPTA | 10 | CN986 | 30 | 0 | 92 | 1.0 | $6.7 \times 10^{-12}$ | $2.4 \times 10^{-16}$ |

From the result summarized in Table 2, it turns out that the cured film product of the present invention has high gas barrier properties along with good quality in transparency compared to the corresponding blank samples which containing no inorganic nanoplatelets.

Figure 12:
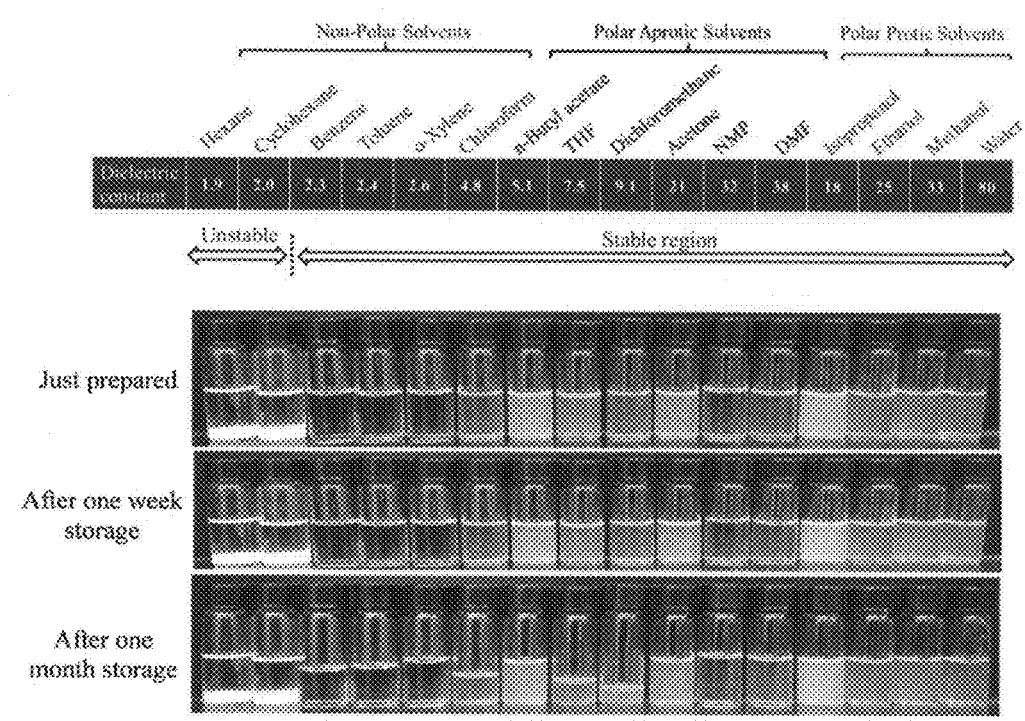
FIG. 12 shows stability of the Jeffamine M1000 modified ZrP with a concentration of 10 mg/mL in different solvents.
Figures 13A, 13B, 13C, 13D, 13E, 13F:
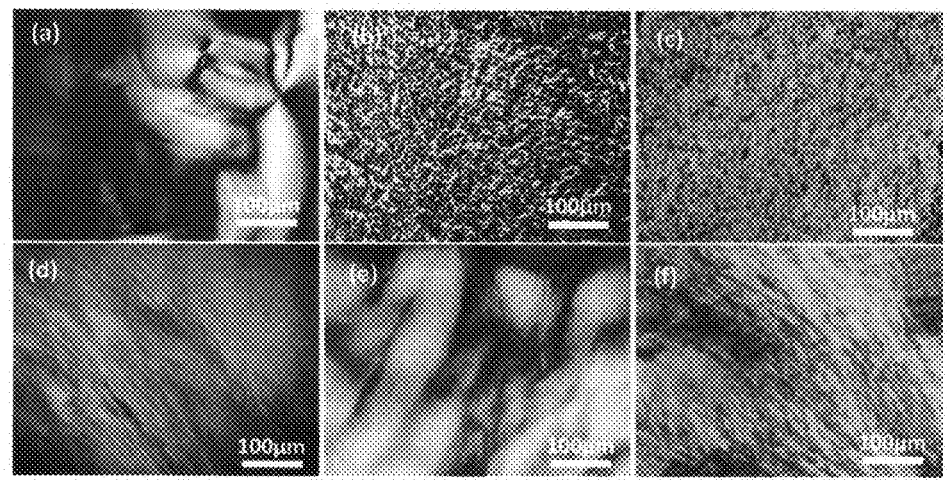
FIGS. 13A-13F show cross-polarized light optical micrographs of an oligomer modified ZrP in various solvents showing strong birefringence including: xylene (FIG. 13A), water (FIG. 13B), acetone (FIG. 13C), ethanol (FIG. 13D), DMF (FIG. 13E), and THF (FIG. 13F), respectively.

To investigate the suitability of our oligomer modified ZrP for a different coating system, a series of Jeffamine M1000 exfoliated ZrP in various solvents were prepared (FIG. 12). The oligomer modified ZrP were shown to be stable in most solvents investigated, with the exceptions of hexane and cyclohexane, which have extremely low dielectric constants. Amphiphilic Jeffamine M1000 is composed of relatively hydrophobic propyleneoxide and hydrophilic ethyleneoxide blocks, which makes the Jeffamine M1000-modified ZrP stable in both organic and aqueous solvents.

[3] A. R. Marder, *Prog. Mater. Sci.* 2000, 45, 191.

[4] A. Mitra, Z. Wang, T. Cao, H. Wang, L. Huang, Y. Yan, *J. Electrochem. Soc.* 2002, 149, 472.

[5] X. Cheng, Z. Wang, Y. Yan, *Solid-State Lett.* 2001, 4, B23.

[6] F. Zhang, L. Zhao, H. Chen, S. Xu, D. G. Evans, X. Duan, *Angew. Chem. Int.* Ed. 2008, 47, 2466.

[7] F. Zhou, Z. Li, G. Shenoy, L. Li, H. Liu, *ACS Nano* 2013, 7, 6939.

[8] S. Chen, L. Brown, M. Levendorf, W. Cai, X. Li, C. Magnuson, R. Piner, J. Kang, J. Park, R. S. Ruoff, *ACS Nano* 2011, 5, 1321.

[9] X. He, C. Chiu, M. Esmacherb, H. Liang, *Surface and Coatings Technology* 2013, 237, 320.

[10] K. L. Choy, *Prog. Mater. Sci.* 2003, 48, 57.

[11] T. K. Rout, G. Jha, A. Singh, N. Bandyopadhyay, O. N. Mohanty, *Surface & Coatings Technology* 2003, 167, 16.

[12] M. L. Zheludkevich, I. Salvado, M. Ferreira, *J Mater. Chem.* 2005, 15, 5099.

[13] A. Leon, R. Pernites, R. Advincula, *ACS Appl. Mater. Interfaces* 2012, 4, 3169.

[14] Z. Chen, Z. Dong, D. Yang, H. Lu, *Adv. Mater.* 2013, 25, 5352.

[15] M. Liu, S. Wang, Z. Wei, Z. Song, L. Jiang, *Adv. Mater.* 2009, 21, 665.

[16] F. Chen, P. Liu, *ACD Appl. Mater. Interfaces* 2011, 3, 2694.

[17] A. Yağan, N. Özçiçek, P. Yildiz, *Electrochimica Acta* 2008, 30, 5242.

[18] T. Yeh, T. Huang, H. Huang, Y. Huang, Y. Cai, S. Lin, J. Yeh, *Polym. Chem.* 2012, 3, 2209.

[19] C. Chang, T. C. Huang, C. W. Peng, T. Yeh, H. Lu, J. M. Yeh, *Carbon* 2012, 14, 5044.

[20] M. Behzadnasaba, S. M. Mirabedinia, M. Esfandehb, *Corrosion Science* 2013, 75, 134.

[21] M. Behzadnasaba, S. M. Mirabedinia, K. Kabiria, S. Jamalib, *Corrosion Science* 2011, 89.

[22] T. C. Huang, Y. A. Sua, T. C. Yeha, C. P. Wua, K. Huang, Y. C. Chou, J. Yeh, Y. Wei, *Electrochimica Acta* 2011, 56, 6142.

[23] L. Sun, W. Boo, A. Clearfield, H.-J. Sue, *Journal of Membrane Science* 2008, 318, 129.

[24] R. Nair, H. Wu, P. Jayaram, I. Grigorieva, A. Geim, *Science* 2012, 335, 442.

[25] N. Lape, E. Nuxoll, E. L. Cussler, *Journal of Membrane Science* 2004, 236, 29.

[26] C. Lu, Y. Mai, *Composites Science and Technology* 2007, 67, 2895.

[27] P. Podsiadlo, A. Kaushik, E. Arruda, B. Shim, J. Xu, H. Nandivada, A. Ramamoorthy, N. A. Kotov, *Science* 2007, 318, 80.

[28] P. Podsiadlo, M. Michel, K. Critchley, S. Srivastava, M. Qin, J. W. Lee, E. Verploegen, A. J. Hart, Y. Qi, N. A. Kotov, *Angew. Chem., Int.* Ed. 2009, 38, 7073.

[29] E. Munch, M. E. Launey, D. H. Alsem, E. Saiz, A. P. Tomsia, R. O. Ritchie, *Science* 2008, 322, 1516.

[30] K. Putz, O. C. Compton, M. Palmeri, S. Nguyen, C. Brinson, *Adv. Funct. Mater.* 2010, 20, 3322.

[31] P. Sarkar, P. S. Nicholson, *J. AM Cerem. Soc.* 1996, 79, 1987.

[32] B. R. Heywood, S. Mann, *Adv. Mater.* 1994, 6, 9.

[33] L. J. Bonderer, A. R. Studart, L. J. Gauckler, *Science* 2008, 319, 1069.

[34] L. Sun, J. Y. O'reilly, D. Kong, J. Su, W. Boo, H. J. Sue, A. Clearfield, *J Colloid Interface Sci.* 2009, 15, 503.

[35] L. Sun, W. J. Boo, R. Browning, H. J. Sue, A. Clearfield, *Chem. Mater.* 2005, 17, 5606.

[36] J. W. Goodby, M. Waugh, S. Stein, E. Chin, R. Pindak, J. Patel, *Nature* 1989, 337, 449.

[37] P. Li, M. Wong, X. Zhang, H. Yao, R. Ishige, A. Takahara, M. Miyamoto, R. Nishimura, H. J. Sue, *ACS photonics* 2014, 1, 79.

[38] M. Wong, R. Ishige, T. Hoshino, S. Hawkins, P. Li, A. Takahara, H. J. Sue, *Chem. Mater.* 2014, DOI: 10.1021/cm402991c.

[39] R. Hoppe, G. Alberti, U. Costantino, C. Dionigi, G. Schulzekloff, R. Vivani, *Langmuir* 1997, 13, 7252.

[40] M. Felix, K. Kassapidou, H. Lekkerkerker, *Nature* 2000, 406, 868.

[41] J. Gabriel, F. Camerel, B. Lemaire, P. Davidson, *Nature* 2001, 413, 504.

[42] H. Yockellleliévre, J. Desbiens, A. Ritcey, *Langmuir* 2007, 23, 2843.

[43] N. Urakami, M. Imai, Y. Sano, M. Takasu, *J. Chem. Phys.* 1999, 111, 2322.

[44] R. K. Singh Raman, P. M. Ajayan, *Carbon* 2012, 50, 4040.

[45] G. Kear, B. D. Barker, F. C. Walsh, *Corrosion Science* 2004, 46, 109.

[46] E. L. Cussler, S. E. Hughes, W. J. Ward, R. Aris, *J. Membr. Sci.* 1988, 38, 161.

[47] L. Yang, S. Phua, C. Toh, S. Lau, J. Ma, X. Lu, *ACS Appl. Mater. Interfaces* 2011, 3, 3026.

[S1] J. M. Yeha, H. Y. Huanga, C. L. Chena, W. F. Sua, Y. H. Yub, *Surface & Coatings Technology* 2006, 200, 2753.

[S2] M. Nooshabadi, S. M. Ghoreishi, M. Behpour, *Corrosion Science* 2011, 53, 3035.

[S3] M. Nematollahia, M. Heidariana, M. Peikaria, S. M. Kassirihab, N. Arianpouyaa, M. Esmaeilpoura, *Corrosion Science* 2010, 52, 1809.

[S4] C. Chang, T. C. Huang, C. W. Peng, T. Yeh, H. Lu, J. M. Yeh, *Carbon* 2012, 14, 5044.

[S5] T. C. Huang, Y. A. Sua, T. C. Yeha, C. P. Wua, K. Huang, Y. C. Chou, J. Yeh, Y. Wei, *Electrochimica Acta* 2011, 56, 6142.

[S6] Y. Yu, Y. Lin, C. Lin, C. Chan, Y. Huang, *Polym. Chem.* 2014, 66, 535.

[S7] K. Chang, M. Hsu, H. Lu, M. Lai, J. Yeh, W. Liu, *Carbon* 2014, 66, 144.

[S8] C. H. Chang, M. H. Hsu, C. Weng, W. Hung, T. Chuang, K. Chang, C. Peng, Y. Yen, J. Yeh, *J. Mater. Chem.* 2013, 1, 13869.

[S9] H. Huang, T. Huang, T. Yeh, C. Y. Tsai, C. Lai, M. Tsai, J. Yeh, Y. C. Chou, *Polymer* 2011, 52, 2391.

[S10] Y C. Chou, P. C. Lee, T. F. Hsu, W. Y. Huang, L. Z. Han, C. Y. Chuang, T. I. Yang, J. M. Yeh, *Polymer Composite* 2013, DOI. 10.1002/pc.22703.

[S11] M. A. Hegazy, M. M. Hefny, A. M. Badawi, M. Y. Ahmed, *Progress in Organic Coatings* 2013, 76, 827.

[S12] C. Zhou, X. Lu, Z. Xin, J. Liu, Y. Zhang, *Corrosion Science* 2013, dx.doi.org/10.1016/j.corsci.2013.11.042.

[S13] A. Maged, V. Morbidelli, U. Suter, Macromolecules 2004, 37, 7250.

[S14] O. Compton, S. Kim, C. Pierre, J. Torkelson, S. Nguyen, Adv. Mater. 2010, 22, 4759.

[S15] J. Yeh, H. Huang, Chi. Chen, Wen. Su, Y. Yu, Coat. Technol. 2006, 200, 2753.

[S16] L. Sun, W. Boo, A. Clearfield, H. J. Sue, Journal of Membrane Science, 318, 129.

[S17] T. Yeh, T. Huang, H. Huang, Y. Huang, Y. Cai, S. Lin, J. Yeh, *Polym. Chem.* 2012, 3, 2209.

Obviously, numerous modifications and variations of the present invention are possible in light of the above teachings. It is therefore to be understood that within the scope of the appended claims, the invention may be practiced otherwise than as specifically described herein.

What is claimed is:

1. A coating composition, comprising:
    a matrix comprising a resin;
    a plurality of inorganic nanoplatelets comprising α-zirconium phosphate; and
    an oligomer,
    wherein the inorganic nanoplatelets are modified by the oligomer and form a mesomorphic structure in the matrix.

2. The coating composition according to claim 1, wherein the resin comprises at least one polymeric resin selected from the group consisting of an epoxy resin, a poly(meth)

acrylate, a polyurethane, a polyester, a polyolefin, an amorphous cycloolefin copolymer, a polyimide, a polycarbonate, a polyvinyl chloride, and a polystyrene.

3. The coating composition according to claim 1, wherein the resin comprises at least one selected from the group consisting of an epoxy resin monomer, a (meth)acrylate monomer, an epoxy acrylate, a urethane acrylate, an acrylic acrylate, a polyester acrylate, a thermosetting urethane, a thermosetting polyester, an alkyd resin, and a phenolic resin.

4. The coating composition according to claim 1, wherein the inorganic nanoplatelets additionally comprise at least one inorganic material selected from the group consisting of a natural silicate, a synthetic silicate, montmorillonite, bentonite, laponite, a metal phosphate, a metal oxide, a metal hydroxide, graphite, graphene, and a derivative thereof.

5. The coating composition according to claim 1, wherein the oligomer comprises at least one selected from the group consisting of an amine and an amide.

6. The coating composition according to claim 5, wherein the oligomer comprises a polyether monoamine.

7. A coating produced by a process comprising applying the coating composition according to claim 1.

8. A cured product produced by a process comprising curing the coating composition according to claim 1, wherein the cured product comprises a polymer resin matrix obtained by curing the resin.

9. The cured product according to claim 8, wherein an amount of the inorganic nanoplatelets in the coating composition is at least 5 wt % and less than 30 wt %.

10. The cured product according to claim 8, wherein the inorganic nanoplatelets form a smectic structure.

11. The cured product according to claim 10, wherein the mesomorphic structure has a d-spacing of 130 nm or less.

12. A metal material, comprising:
a metal having a surface coated with the coating composition according to claim 1,
wherein the metal is at least one selected from the group consisting of steel, aluminum, titanium, magnesium, copper, brass, and an alloyed metal including thereof.

13. A polymer film, comprising:
a film having at least one surface coated with the coating composition according to claim 1,
wherein the film comprises at least one selected from the group consisting of a poly(meth)acrylate, a polyurethane, a polyester, a polyolefin, a polyimide, a polycarbonate, a polyester, a polystyrene, a poly(meth)acrylate-co-styrene, and a cellulose derivative.

14. The cured product according to claim 8, wherein the cured product is a photocurable coating composition.

15. The metal material according to claim 12, wherein the cured product is made from a photocurable coating composition.

16. The polymer film according to claim 13, wherein the cured product is made from a photocurable coating composition.

17. A coating composition, comprising:
a matrix comprising a resin;
a plurality of inorganic nanoplatelets; and
an oligomer comprising a polyether monoamine,
wherein the inorganic nanoplatelets are modified by the oligomer and form a mesomorphic structure in the matrix.

* * * * *

UNITED STATES PATENT AND TRADEMARK OFFICE
CERTIFICATE OF CORRECTION

Page 1 of 1

PATENT NO.           : 10,259,948 B2
APPLICATION NO.      : 14/757509
DATED                : April 16, 2019
INVENTOR(S)          : Peng Li et al.

It is certified that error appears in the above-identified patent and that said Letters Patent is hereby corrected as shown below:

On the Title Page

Related U.S. Application Data is omitted. Item (63) and Item (60) should be included:
Related U.S. Application Data
(63) Continuation-in-part of application No. PCT/US2015/022488, filed on Mar. 25, 2015.
(60) Provisional application No. 62/096,314, filed on Dec. 23, 2014, provisional application No. 61/970,028, filed on Mar. 25, 2014.

Signed and Sealed this
Twenty-eighth Day of April, 2020

Andrei Iancu
*Director of the United States Patent and Trademark Office*